United States Patent
Suzuki

(12) 
(10) Patent No.: US 6,273,073 B1
(45) Date of Patent: Aug. 14, 2001

(54) INTERNAL COMBUSTION ENGINE HAVING COMBUSTION HEATER

(75) Inventor: Makoto Suzuki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/204,895

(22) Filed: Dec. 3, 1998

(30) Foreign Application Priority Data

Dec. 8, 1997 (JP) .................................................... 9-337500
Feb. 2, 1998 (JP) .................................................. 10-021350

(51) Int. Cl.$^7$ ....................................................... F02N 17/06
(52) U.S. Cl. ................................................................. 123/550
(58) Field of Search ................................... 123/550, 555, 123/179.21

(56) References Cited

U.S. PATENT DOCUMENTS

| | | |
|---|---|---|
| 2,290,300 | 7/1942 | Spackman . |
| 3,526,214 | * 9/1970 | Kamo ................... 123/550 |
| 4,002,025 | 1/1977 | Yamaguchi et al. ............ 60/274 |
| 4,030,464 | 6/1977 | Yamaguchi et al. .............. 123/122 |
| 4,169,448 | * 10/1979 | Hodge et al. ...................... 123/550 |
| 4,176,651 | * 12/1979 | Backus ......................... 123/550 |
| 4,212,162 | 7/1980 | Kobayashi . |
| 4,246,879 | * 1/1981 | Fiala ............................... 123/550 |
| 4,858,825 | 8/1989 | Kawamura . |
| 4,927,077 | 5/1990 | Okada . |
| 5,377,440 | * 1/1995 | Eller et al. ...................... 123/550 |
| 5,402,757 | * 4/1995 | Eller et al. ...................... 123/550 |

FOREIGN PATENT DOCUMENTS

| | | |
|---|---|---|
| 4411959 | 10/1995 | (DE) . |
| 271999 | 6/1988 | (EP) . |
| 1497428 | 12/1967 | (FR) . |
| 2381175 | 9/1978 | (FR) . |
| 2041081 | 9/1980 | (GB) . |
| 1595060 | 8/1991 | (GB) . |
| 918466 | 4/1980 | (RU) . |

OTHER PUBLICATIONS

Patent Abstracts of Japan, vol. 005, No. 033 (M–057), Feb. 28, 1981 & JP 55 160158 A (Nissan Motor Co., Ltd.), Dec. 12, 1980.
Copending U.S. Application No. 09/165,222, filed Oct. 1, 1998.
Copending U.S. Application No. 09/193,431, filed Nov. 17, 1998.
Copending U.S. Application No. 09/213,799, filed Dec. 17, 1998.
Copending U.S. Application No. 09/213,051, filed Dec. 16, 1998.
Patent Abstracts of Japan, vol. 018, No. 600 (P–1826), Nov. 15, 1994 & JP 06 222867 A (Sharp Corp.), Aug. 12, 1994.

* cited by examiner

*Primary Examiner*—Marguerite McMahon
(74) *Attorney, Agent, or Firm*—Kenyon & Kenyon

(57) ABSTRACT

An internal combustion engine having a combustion heater is constructed to prevent a thermal damage to the structure of an intake system due to combustion heat emitted from the combustion heater. The engine includes the combustion heater operating at a cold time. Cooling water is warmed by heat of combustion gas emitted from the combustion heater when in combustion, thereby speeding up a warm-up of the engine and enhancing a performance of a car room heater of a vehicle mounted with the engine. In the thus constructed internal combustion engine having the combustion heater, fresh air entering an intake air passageway of the engine is mixed with the combustion gas of the combustion heater, whereby the fresh air becomes a combustion gas mixed intake air toward an engine body. A temperature of the combustion gas mixed intake air is obtained, and a combustion state of the combustion heater is controlled based on this temperature.

8 Claims, 18 Drawing Sheets

INTERNAL COMBUSTION ENGINE HAVING COMBUSTION HEATER

BACKGROUND OF THE INVENTION

1. Field of the Invention

The present invention relates to an internal combustion engine having a combustion heater.

2. Related Background Art

It is required that a warm-up of an internal combustion engine be speeded up at a cold time, and it is desirable to enhance a performance of a car room heater of a vehicle mounted with the internal combustion engine.

This being the case, for example, Japanese Patent Application Laid-Open Publication No. 62-75069 discloses a technology of increasing a temperature of the so-called engine cooling water contained in an internal combustion engine body by utilizing combustion heat emitted from a combustion heater provided in a intake system separately from an internal combustion engine body and thereby speeding up the warm-up thereof and enhancing the performance of the car room heater.

Such an effect can be expected on one hand, however, in the internal combustion engine having the combustion heater, there might arise a serious concern about a thermal damage to a intake system structure on the other hand because of an excessive rise in a intake system temperature due to an influence by combustion heat emitted from the combustion heater.

SUMMARY OF THE INVENTION

It is a primary object of the present invention, which was devised under such circumstances, to provide a technology of preventing a thermal damage to a intake system structure due to combustion heat emitted from a combustion heater in an internal combustion engine having a combustion heater.

To accomplish the above object, according to a first aspect of the present invention, an internal combustion engine having a combustion heater may comprise a combustion heater operating when the internal combustion engine is in a predetermined operation state, and engine related elements warmed by heat of a combustion gas emitted by the combustion heater during a combustion to speed up a warm-up of the internal combustion engine and to enhance a performance of a car room heater of a vehicle mounted with the internal combustion engine, wherein fresh air becomes a combustion gas mixed intake air flowing toward the internal combustion engine body by mixing the combustion gas of the combustion heater with the fresh air entering a intake air passageway of the internal combustion engine, a temperature of the combustion gas mixed intake air is obtained, and a combustion state of the combustion heater is controlled based on this temperature.

"when the internal combustion engine is in the predetermined operation state" expressed herein may include a time when the engine is on the operation or after starting up the internal combustion engine at a cold time or at an extremely cold time, and when an heating value from the internal combustion engine itself is small due to e.g., a burned fuel quantity is small as well as when a heat receiving value of cooling water is thereby small. Then, the cold time implies that an outside air temperature is approximately −10° C. to 15° C., and the extremely cold time implies that the outside air temperature is lower than approximately −10° C.

The "engine related elements" may be engine cooling water and the internal combustion engine itself in which the combustion gas of the combustion heater is mixed in the intake air.

In the internal combustion engine having the combustion heater according to the present invention, the combustion gas emitted from the combustion heater operating when the internal combustion engine is in the predetermined operation state, is mixed in the intake air passageway of the internal combustion engine, whereby fresh air having flowed so far through the intake air passageway becomes a high-temperature combustion gas mixed intake air assuming combustion heat of the combustion gas.

Then, before the combustion gas mixed intake air enters the internal combustion engine body, a temperature of the combustion gas mixed intake air is obtained, and a combustion state of the combustion heater is controlled based on the thus obtained temperature, precisely on a value indicated by this temperature. Therefore, if this control is preferably carried out, an excessive rise in the intake system temperature due to the combustion heat can be restrained while speeding up the warm-up and enhancing the performance of the car room heater by utilizing the combustion heat of the combustion heater. It is therefore feasible to prevent the thermal damage to the intake system structure.

"The control of the combustion state of the combustion heater" expressed herein is to control factors, such as a force and a magnitude etc. of flames in the combustion heater, for determining the increase and decrease in the temperature of the combustion gas emitted from the combustion heater.

What can be exemplified as the "factor" may be, for instance, quantities of the air and the fuel supplied for combustion to the combustion heater etc. Particularly in the case of a combustion heater structured to increase a temperature of the engine cooling water by internally circulating the engine cooling water, what can be exemplified as the "factor" may be, for instance a flow rate etc. of the engine cooling water. By controlling those factors, if the combustion quantity of the combustion heater augments, the flames gains a force to increase in magnitude with the result that the temperature of the flames rises. Then, the temperature of the combustion gas emitted from the combustion heater also rises. Consequently, the temperature of the combustion gas mixed intake air also rises.

Whereas if the combustion quantity of the combustion heater decreases, the flames loses the force to decrease in magnitude, and the temperature of the flames also loses, with the result that the temperature of the combustion gas emitted from the combustion heater lowers. Consequently, the temperature of the combustion gas mixed intake air also lowers.

Moreover, the warm-up is speeded up by utilizing the combustion gas of the combustion heater, which emits almost no smokes, in other words, contains no carbon, and therefore it can be expected that the durability be more enhanced than by a prior art EGR etc.

Then, since the combustion gas discharge passageway of the combustion heater communicates with the intake air passageway, the combustion gas of the combustion heater is again burned in the internal combustion engine. Subsequently, when the combustion gas can be, upon reaching the exhaust system of the internal combustion engine, purified by an exhaust catalyst normally provide in this exhaust system.

Moreover, apertures of the combustion gas discharge passageway and the air supply passageway of the combustion heater are not exposed directly to the atmospheric air, and hence an effect of reducing noises can be expected.

According to a second aspect of the present invention, an internal combustion engine having a combustion heater may further comprise a combustion gas mixed intake air temperature detecting element for obtaining a temperature of the combustion gas mixed intake air by actually measuring this temperature.

As "the combustion gas mixed intake air temperature detecting element", e.g., a temperature sensor may be exemplified.

According to a third aspect of the present invention, an internal combustion engine having a combustion heater may further comprise a combustion gas mixed intake air temperature calculating element for obtaining a temperature of the combustion gas mixed intake air by calculating a temperature of the fresh air and a temperature of the combustion gas. As a combustion gas mixed intake air temperature calculating element, it is preferable to use, for example, a two-dimensional map consisting of a temperature of the fresh air before being mixed with the combustion gas and an exhaust temperature of the combustion gas.

"The two-dimensional map" is structured such that, for instance, the axis of ordinates indicates the exhaust temperature of the combustion gas while the axis of abscissa indicates the temperature of the fresh air before being mixed with the combustion gas, and a cross point therebetween indicates a temperature of the combustion gas mixed intake air. Further, for obtaining the combustion gas mixed intake air temperature corresponding to the rotational speed of the internal combustion engine, it is desirable that there be prepared a plurality of two-dimensional maps corresponding to the rotational speed such as, e.g., 1000 rpm, 2000 rpm, . . . A read-only memory ROM incorporated into an engine electronic control unit ECU is previously stored with the above two-dimensional maps.

In the case of a combustion heater structured to increase a temperature of the engine cooling water by internally circulating the engine cooling water according to a fourth aspect of the present invention, in an internal combustion engine having a combustion heater, the calculation by the combustion gas mixed intake air temperature calculating element may, when executing a calculation, include the rotational speed of the internal combustion engine. In this case, the read-only memory ROM is previously stored with a specific arithmetic formula instead of the two-dimensional maps as a combustion gas mixed intake air calculating element.

For example, the following equation may be preferable as a "specific arithmetic formula".

$$Tm=\{(1-\alpha)T1+k\alpha T2\}/(1-\alpha+k\alpha)$$

where

Tm: the calculated temperature of the combustion gas mixed intake air,

T1: the temperature of the fresh air before being mixed with the combustion gas, T2: the exhaust temperature of the combustion gas, Ne: the rotational speed $\alpha$: the quantity of the fresh air for combustion of combustion heater (the quantity is obtained by arithmetic formula: $\alpha=\alpha 0/Ne$, where $\alpha 0$ is the compensation constant when the rotational speed Ne differs and is preferably, e.g., 0.2.), and k: the compensation constant (when the fresh air $\alpha$ is supplied for the combustion upon an operation of the combustion heater, a combustion gas $\alpha'$ having a mass over the fresh air quantity $\alpha$ is emitted from the combustion heater with burning of the fuel for combustion in the combustion heater. The constant k is a numerical value determined taking into consideration an existence of this combustion gas $\alpha'$.)

Note that a combustion gas mixed intake air temperature calculating element may be constructed of a combination of the two-dimensional maps with the arithmetic formula.

Further, the calculated temperature Tm of the combustion gas mixed intake air is the value taking the rotational speed (intake air quantity) into consideration, and may therefore be said to be highly accurate corresponding to the operation state of the internal combustion engine at the time concerned.

According to a fifth aspect of the present invention, an internal combustion engine having a combustion heater, may comprise a combustion heater operating when the internal combustion engine is in a predetermined operation state, and engine related elements warmed by heat of a combustion gas emitted by the combustion heater during a combustion to speed up a warm-up of the internal combustion engine and to enhance a performance of a car room heater of a vehicle mounted with the internal combustion engine, wherein a combustion state of the combustion heater is controlled based on a temperature of fresh air itself entering an intake air passageway of the internal combustion engine.

The time "when the internal combustion engine is in the predetermined operation state" and "the engine related elements" expressed herein are the same as those stated according to the first aspect of the invention.

In this case, an intake air temperature can be optimally controlled because of taking into consideration the temperature of the fresh air itself, i.e., the temperature of the intake air before being mixed with the combustion gas.

According to a sixth aspect of the present invention, an internal combustion engine having a combustion heater, may comprise a combustion heater operating when the internal combustion engine is in a predetermined operation state, and engine related elements warmed by heat of a combustion gas emitted by the combustion heater during a combustion to speed up a warm-up of the internal combustion engine and to enhance a performance of a car room heater of a vehicle mounted with the internal combustion engine, wherein a combustion state of the combustion heater is controlled based on a temperature of the combustion gas itself emitted from the combustion heater. The time "when the internal combustion engine is in the predetermined operation state" and "the engine related elements" expressed herein are the same as those stated according to the first aspect of the invention.

In this case, since the temperature of the combustion gas itself is taken into consideration, the intake air temperature can be optimally controlled.

According to a seventh aspect of the present invention, it is desirable that a combustion quantity of the combustion heater be decreased when the temperature of the combustion gas mixed intake air flowing through the intake air passageway of the internal combustion engine, or the temperature itself of the fresh air, or the temperature itself of the combustion gas of the combustion heater is over a predetermined value.

"The predetermined value" given herein is a temperature enough to cause the thermal damage to the intake system structure.

In this case, considering the temperature enough to cause the thermal damage to the intake system structure, the combustion quantity of the combustion heater is decreased when the temperature of the combustion gas mixed intake air, or the temperature itself of the fresh air, or the temperature of the combustion gas of the combustion heater is high, and it is therefore feasible to restrain a decline of the durability of the intake system.

According to an eighth aspect of the present invention, an internal combustion engine having a combustion heater may comprise a combustion heater operating when the internal combustion engine is in a predetermined operation state, and engine related elements warmed by heat of a combustion gas emitted by the combustion heater during a combustion to speed up a warm-up of the internal combustion engine and to enhance a performance of a car room heater of a vehicle mounted with the internal combustion engine. The combustion heater includes an air passageway for supplying the air used for the combustion of the heater via an intake air passageway of the internal combustion engine, and a combustion gas discharge passageway for discharging the combustion gas emitted from the combustion heater into the intake air passageway. An air flow meter is provided at a portion, disposed upstream of a connecting point between the combustion gas discharge passageway and the intake air passageway, of the intake air passageway.

The time "when the internal combustion engine is in the predetermined operation state" and "the engine related elements" expressed herein are the same as those stated according to the first aspect of the invention. The combustion heater is connected in bypass to the intake air passageway through the air supply passageway and the combustion gas discharge passageway.

Further, the air flow meter may be defined as an air resisting structure which hinders a flow of air flowing through the intake air passageway, and therefore a pressure of the air flowing out of the air flow meter is smaller than a pressure of the air entering the air flow meter. Namely, the air flow meter has a difference in the air pressure between an inlet and an outlet thereof.

Then, in this instance, since the air flow meter is provided at the portion disposed upstream of a connecting point between the combustion gas discharge passageway and the intake air passageway, the high-temperature exhaust gas of the combustion heater is not sucked in the air flow meter. Hence, the thermal damage to the air flow meter can be prevented.

According to a ninth aspect of the present invention, the air flow meter may also be provided between a connecting point of the intake air passageway to the air supply passageway and a connecting point of the intake air passageway to the combustion gas discharge passageway.

In this case however, as for a type of the air flow meter, it is required that, for example, a hot wire type or film type air flow meter with a less pressure difference between the inlet side and the outlet side be used. With this contrivance, even when the air flow meter as the air resisting structure is provided between the connecting point of the intake air passageway to the air supply passageway and the connecting point of the intake air passageway to the combustion gas discharge passageway, due to the existence of the air flow meter, it never happens that an ignition becomes hard to attain because of an air flow velocity not increasing inside the combustion heater.

According to a tenth aspect of the present invention, the air flow meter may be provided at a portion, disposed upstream of the connecting point between the air supply passageway and the intake air passageway, of the intake air passageway.

In this instance, as for the type of the air flow meter, there may be used an air flow meter with a pressure difference between the inlet side and the outlet side. The reason why so is that since there is provided no air flow meter along the intake air passageway between the connecting point of the air supply passageway to the intake air passageway and the connecting point of the combustion gas discharge passageway to the intake air passageway, with respect to the combustion heater connected in bypass to the intake air passageway, there is almost no pressure difference between the connecting point, serving as an inlet of the bypass, of the air supply passageway to the intake air passageway and the connecting point, serving as an outlet of the bypass, of the combustion gas discharge passageway to the intake air passageway, and therefore the air flow velocity becomes lower inside the combustion heater located between the air supply passageway and the combustion gas discharge passageway that form the bypass, and also constituting a part of the bypass in communication therewith. Accordingly, a well-conditioned ignition of the combustion heater is attained at all times.

According to an eleventh aspect of the present invention, an internal combustion engine having a combustion heater may comprise a combustion heater operating when the internal combustion engine is in a predetermined operation state, and engine related elements warmed by heat of a combustion gas emitted by the combustion heater during a combustion to speed up a warm-up of the internal combustion engine and to enhance a performance of a car room heater of a vehicle mounted with the internal combustion engine, wherein the intake air passageway is provided with a supercharger for pressurizing the intake air by forcibly intruding the intake air into the internal combustion engine body, and a combustion state of the combustion heater is controlled based on a pressure of the intake air in the intake air passageway when the supercharger is operated.

The time "when the internal combustion engine is in the predetermined operation state" and "the engine related elements" expressed herein are the same as those stated according to the first aspect of the invention.

What can be exemplified as the "supercharger" may be a supercharger of which a driving source is a rotational force of an output shaft of the internal combustion engine, and a turbo charger, using an exhaust turbine, of which a driving force is a rotational force thereof.

According to a twelfth aspect of the present invention, a combustion quantity of the combustion heater may be decreased when the intake air pressure is equal to or higher than a set value. The "set value" given herein is a value of a intake air pressure capable of exerting no burden upon an inter cooler normally set coupled with the supercharger as well as being a certain fixed intake air pressure value set for preventing an excessive rise in the intake air temperature due to an increase in the intake air pressure.

With this contrivance, even when the temperature of the intake air rises with the increased intake air pressure, the combustion quantity of the combustion heater is reduced corresponding thereto, and a preferable intake air temperature can be thereby gained. It is therefore possible to relieve the burden upon the inter cooler.

According to a thirteenth aspect of the present invention, the combustion quantity of the combustion heater may be decreased when the temperature of the combustion gas mixed intake air and the intake air pressure are respectively equal to or higher than specified values. In this case also, the burden on the inter cooler can be relieved. Note that the specified value given herein is the same as the predetermined value in the seventh aspect of the invention in the case of the temperature of the combustion gas mixed intake air, and the set value described above in the case of the intake air pressure.

According to a fourteenth aspect of the present invention, an internal combustion engine having a combustion heater may comprise a combustion heater, and engine related elements warmed by heat of a combustion gas emitted by the combustion heater during a combustion to speed up a warm-up of the internal combustion engine and to enhance a performance of a car room heater of a vehicle mounted with the internal combustion engine, wherein the combustion gas of the combustion heater is introduced into the intake air passageway of the internal combustion engine, and a combustion quantity of the combustion heater is decreased when the internal combustion engine is in a predetermined operation state with a small intake air quantity.

"The engine related elements" expressed herein are the same as that stated according to the first aspect of the invention.

"The small intake air quantity" implies a case where the number of engine rotations is small, and a case where an aperture of a throttle valve is small, which are respectively explained in the following fifteenth and sixteenth aspects of the invention.

When the combustion gas of the combustion heater enters the intake air passageway, the fresh air becomes the combustion gas mixed intake air toward the internal combustion engine. The combustion gas mixed intake air is a mixed gas of the high-temperature combustion gas with the cold outside fresh air. Hence, if the quantity of the combustion gas contained in the combustion gas mixed intake air per unit capacity remains the same, and if a quantity of the fresh air is small, the temperature of the combustion gas mixed intake air rises. By contrast, if the quantity of the fresh air is large, the temperature of the combustion gas mixed intake air lowers.

In the internal combustion engine having the combustion heater according to the present invention, when the internal combustion engine is in the predetermined operation state with the small quantity of the air sucked inside the engine, i.e., with the small fresh air quantity, the combustion gas quantity in the combustion heater is decreased, and consequently the temperature of the combustion gas mixed intake air lowers. Accordingly, it is feasible to prevent the thermal damage from being exerted upon the intake system structure by controlling well the ratio of the combustion gas to the fresh air.

According to a fifteenth aspect of the present invention, the rotational speed may be set under a predetermined value when in the predetermined operation state.

"When in the predetermined operation state" expressed herein is the same as that stated in the fourteenth aspect of the invention.

"The predetermined value of the rotational speed" is a specified rotational speed set slightly higher than another specified rotational speed. The former specified rotational speed is hereinafter referred to as a target rotational speed. The latter is hereinafter referred to as a limit rotational speed. The limit rotational speed is a rotational speed for ensuring an intake air quantity making the combustion gas mixed intake air temperature high enough to exert the thermal damage to the structure of intake system if the internal combustion engine is driven with this limit rotational speed, and if the combustion heater continues to operate with the driving of the internal combustion engine.

The reason why the target rotational speed is set higher than the limit rotational speed, is that an allowance of some extent is given to the rotational speed because it might be a trouble that the thermal damage is exerted on the structure of intake system upon reaching of the rotational speed to the target rotational speed.

According to a sixteenth aspect of the present invention, an aperture of a throttle valve may be set under a predetermined value when in the predetermined operation state.

"When in the predetermined operation state" expressed herein is the same as that stated in the fourteenth aspect of the invention.

"The predetermine value of the throttle valve aperture" given herein is a numerical value for indicating a target throttle valve aperture set somewhat higher than a limit throttle valve aperture. The limit throttle valve aperture is a certain throttle valve aperture for ensuring an intake air quantity making the combustion gas mixed intake air temperature high enough to exert the thermal damage to the structure of intake system if the internal combustion engine is driven with this limit throttle aperture when the throttle valve is opened, and if the combustion heater continues to operate in this driven state.

The reason why the target throttle valve aperture is set higher than the limit throttle valve aperture, is that an allowance of some extent is given to the throttle valve aperture because it might be a trouble that the thermal damage is exerted on the structure of intake system upon reaching of the throttle valve aperture to the target throttle valve aperture.

According to a seventeenth aspect of the present invention, the combustion heater may be stopped when in the predetermined operation state.

"When in the predetermined operation state" expressed herein is the same as that stated in the fourteenth aspect of the invention.

"The combustion heater is stopped" may imply, for example, a halt of a fuel pump for supplying fuels to combustion cylinders in which to produce flames serving as a combustion source of the combustion heater, and a halt of a blowing fan, or a combination thereof.

In the internal combustion engine having the combustion heater of the present invention, the combustion heater stops when in the predetermined operation state, i.e., when the quantity of the air sucked inside by the internal combustion engine is small. Then, if the combustion heater stops with a halt of the fuel pump, the fuel supply is cut off, and it follows that the flames are produced by only the residual fuel in the combustion heater. Normally, the residual quantity is small, and consequently a duration of flaming comes to an end in a short time. Hence, a heating value of the combustion heater is remarkably reduced. As a result, the thermal damage to the intake system structure can be prevented when the engine intake quantity is small.

Furthermore, when the combustion heater stops with the halt of the blowing fan, even if the flames leaks out of the combustion heater, it is impossible to supply the air warmed by the flames toward the interior of the internal combustion engine spaced away from the combustion heater because of the blowing fan having stopped, and it follows that the combustion heater substantially does not operate.

Moreover, in the case of the combination type in which the combustion heater stops with the halt of the fuel pump and the halt of the blowing fan, it follows that the combustion heater does not operate completely.

According to an eighteenth aspect of the present invention, an internal combustion engine having a combustion heater may comprise a combustion heater, and engine related elements warmed by heat of a combustion gas emitted by the combustion heater during a combustion to speed up a warm-up of the internal combustion engine and to enhance a performance of a car room heater of a vehicle mounted with the internal combustion engine, wherein the combustion heater operates during not only an operation but also a halt of the internal combustion engine, a combustion gas of the combustion heater is introduced into a body of the internal combustion engine during the operation of the internal combustion engine, and the combustion gas of the combustion heater is introduced into an exhaust system of the internal combustion engine during the halt of the internal combustion engine.

"The operation of the internal combustion engine" expressed herein implies a state where a piston reciprocates within the cylinder, and "the stop of the internal combustion engine" implies a state where the piston does not reciprocate within the cylinder and remains stopped. Then, the combustion heater according to the present invention is contrived to operate solely independently if a proper operation switch for operating the combustion heater is turned ON even when the internal combustion engine is in the stopped state.

In the internal combustion engine having the combustion heater according to the present invention, during the operation of the internal combustion engine, the combustion gas of the combustion heater is introduced into the body of the internal combustion engine and therefore re-burned in the cylinders of the internal combustion engine while being supplied for speeding up the warm-up. Since the re-burned combustion gas of the combustion heater emits almost no smokes, in other words, contains no carbon, an enhancement of the durability of the internal combustion engine can be expected.

Further, if the combustion heater operates during the halt of the internal combustion engine, the combustion gas emitted out of the combustion heater is flowed to the exhaust system of the internal combustion engine and discharged therefrom into the atmospheric air, which may be said to be sufficiently satisfactory as a measure against the exhaust gas of the combustion heater. Accordingly, since the treatment of the exhaust gas of the combustion heater is sufficient even during the stop of the internal combustion engine, it never happens that the combustion heater stops due to an insufficient treatment of the exhaust gas of the combustion heater, and the combustion heater can be independently operated. The combustion heat of the combustion heater is normally also utilized for warming the air blown from the car room heater. Therefore, if the combustion heater is made to work before getting in the car, the car room heater can be switched ON beforehand, so that the interior of the car room is warm and comfortable even at the cold time. Note that a process of previously switching ON and warming up the combustion heater may be termed pre-heating of the combustion heater.

Then, when the combustion heater is in a pre-heating state, the combustion gas emitted from the combustion heater is introduced into the exhaust system, and therefore, on the occasion of this introduction, there may be prepared an element for preventing the combustion gas from passing through the intake system of the internal combustion engine, and an element for sufficiently decreasing the temperature of the combustion gas so that the intake system, even when passing through the intake system, does not suffer from the thermal damage by the combustion gas. What can be exemplified as the element for decreasing the temperature of the combustion gas may be, e.g., an exhaust cooler. It is preferable that the exhaust cooler be disposed, e.g., in the combustion gas discharge passageway through which to connect the combustion heater to the intake system of the internal combustion engine.

According to a nineteenth aspect of the present invention, it is preferable that the combustion gas be discharged into the exhaust system by opening an exhaust gas re-circulation passageway constituting an EGR system.

"The EGR system" described herein is a system for returning a part of the exhaust gas to the intake system and introducing the exhaust gas again into the cylinders. "The exhaust gas re-circulation passageway" is a principal component of the EGR system and is a passageway for re-circulating the exhaust gas from the exhaust air passageway of the internal combustion engine to the intake air passageway thereof, which are connected in bypass to the cylinders of the internal combustion engine. Further, the exhaust gas re-circulation passageway has an EGR valve for controlling a flow rate of the re-circulated exhaust gas.

In the internal combustion engine having the combustion heater according to the present invention, in the case of a vehicle provided with the EGR system, the combustion gas of the combustion heater can be discharged to the exhaust system by using the exhaust gas re-circulation passageway, it is therefore possible to reduce the costs as well as providing the sufficient measure against the exhaust gas of the combustion heater even during the halt of the internal combustion engine.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Figure 1:
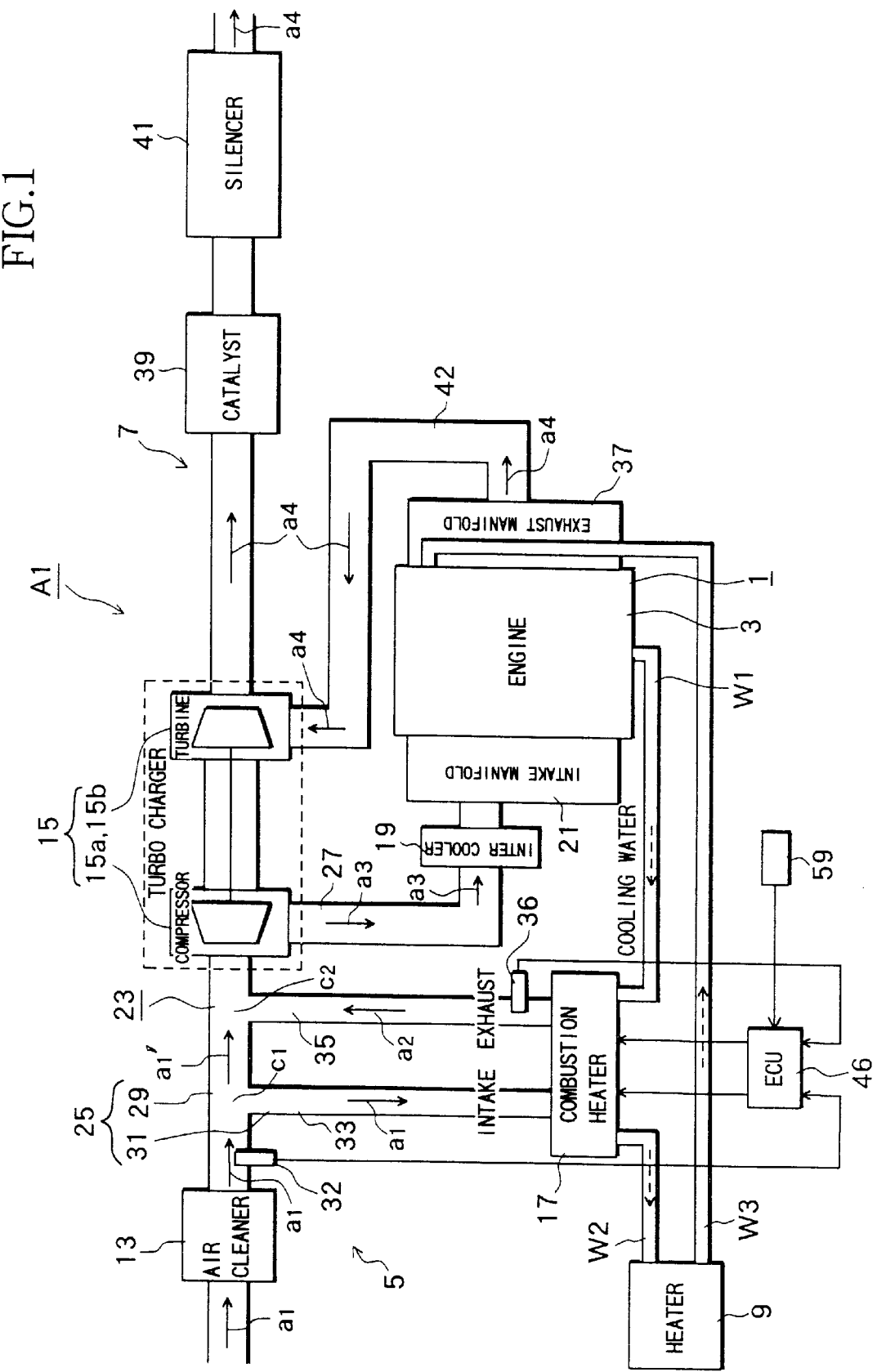
FIG. 1 is a schematic diagram showing a first embodiment of an internal combustion engine having a combustion heater according to the present invention.

Embodiments of the present invention will hereinafter be described with reference to the accompanying drawings.

<First Embodiment>

A first embodiment of the present invention will hereinafter be discussed with reference to FIGS. 1 to 4.

An engine 1 classified as an internal combustion engine is of a water cooling type, and includes an engine body 3 having an unillustrated water jacket through which cooling water is circulated, a air intake device 5 for supplying a plurality of cylinders (not shown) of the engine body 3 with air needed for combustion, an exhaust device 7 for discharging, into the atmospheric air, an exhaust gas after a fuel-air mixture has been burned in the cylinders, and a car room heater 9 for warming a car interior of a vehicle mounted with the engine 1.

The air intake device 5 originates with an air cleaner 13 which is for taking fresh air into the cylinders. Then, a compressor 15a of a turbo charger 15, a combustion heater 17, an inter-cooler 19 and a intake manifold 21, are provided as intake system structures between the air cleaner 13 and an unillustrated intake port of the engine body 3 defined as the terminal of the air intake device 5.

These intake system structures belongs to a intake pipe including a plurality of connection pipes.

The intake pipe 23 is divided roughly by the compressor 15a into two parts, an upstream-side connection pipe 25 and a downstream-side connection pipe 27. The downstream-side connection pipe 27, into which the outside air flowing in the intake device 5 is forcibly intruded by the compressor 15a. Thus the pipe 27 is brought into a pressurized state. And an upstream-side connection pipe 25 is not brought into the pressurized state.

Referring to FIG. 1, the upstream-side connection pipe 25 is constructed of a main pipe 29 taking a rod-like shape extending straight toward the compressor 15a from the air cleaner 13, and a heater branch pipe 31 serving as a tributary pipe connected in bypass to the main pipe 29.

An outside air temperature sensor 32 is fitted to a portion, vicinal to the down-stream-side of the air cleaner 13, of the main pipe 29. Outside air a1 flowing in the main pipe 29 from the air cleaner 13 is fresh air against the exhaust gas of the engine 1, and a temperature thereof is detected by the outside air temperature sensor 32.

The heater branch pipe 31 embraces the combustion heater 17 midways thereof, and connects to the main pipe 29 an upstream-side portion of the combustion heater 17 in an air flowing direction. The heater branch pipe 31 includes an air supply passageway 33 for supplying the air, i.e., the fresh air to the combustion heater 17 via the main pipe 29. The heater branch pipe 31 further includes a combustion gas discharge passageway 35, through which to connect the downstream-side portion of the combustion heater 17 in the air flowing direction to the main pipe 29, for discharging the burned (exhaust) gas coming from the combustion heater 17 into the main pipe 29. Note that the air relative to the heater branch pipe 31 implies not only the fresh air a1 but also a combustion gas a2 emitted from the combustion heater. The combustion gas of the combustion heater is a gas emitting almost no smokes, in other words, a gas containing no carbon. Hence the above combustion gas has no problem when used as the intake air of the internal combustion engine.

A combustion gas temperature sensor 36 is attached to a portion, closer to the combustion heater 17, of the combustion gas discharge passageway 35. The temperature sensor 36 detects a temperature of the combustion gas of the combustion heater 17 before entering the main pipe 29 from the combustion heater 17.

Connecting points c1, c2 are respectively of the air supply passageway 33 to the main pipe 29 and of the combustion gas discharge passageway 35 to the main pipe 29, the connecting point c1 is located more upstream of the main pipe 29 than the connecting point c2. Hence, the air a1 from the air cleaner 13 is separated into the air a1 diverging at first to the heater branch pipe 31 at the connecting point c1, and air a1' not diverging but flowing via the main pipe 29 toward the connecting point c2. Air a2 turned to be a combustion gas from the diverging air a1 after being burned in the combustion heater 17 and the fresh air a1' not diverging at the connecting point c1, become confluent at the connecting point c2 and become combustion gas mixed air a3.

The air a1 diverging at the connecting point c1 flows via such as the air supply passageway 33→the combustion heater 17→the combustion gas discharge passageway 35, and, after becoming the air a2, returns to the main pipe 29 from the connecting point c2. The air a2 returned to the main pipe 29 is the combustion gas having been burned and assuming the heat in the combustion heater 17 and therefore, when confluent with the non-diverging air a1' at the connecting point c2, becomes the combustion gas mixed air a3. Then, as a result, this combustion gas mixed air a3 turns out to be high-temperature intake air entering the engine body 3. A combustion state of the combustion heater 17 is controlled by predicting a temperature of the combustion gas mixed intake air a3. This control method will be discussed later on.

Referring again to FIG. 1, the downstream-side connecting pipe 27 connects the compressor 15a to the intake manifold 21, and takes a substantially L-shape as far as the pipe 27 shown in FIG. 1 is concerned.

Further, the inter-cooler 19 is disposed in a portion closer to the intake manifold 21.

On the other hand, the exhaust device 7 originates from an unillustrated exhaust port of the engine body 3 and terminates with a silencer 41, in which section there are provided an exhaust manifold 37, a turbine 15b of the turbo charger 15 and an exhaust catalyst 39 along an exhaust pipe 42. These well-known components are not directly related to the present invention, and hence the explanation thereof is omitted herein. The air flowing through the exhaust device 7 is designated by a reference symbol a4 as an exhaust gas of the engine 1.

Figure 2:
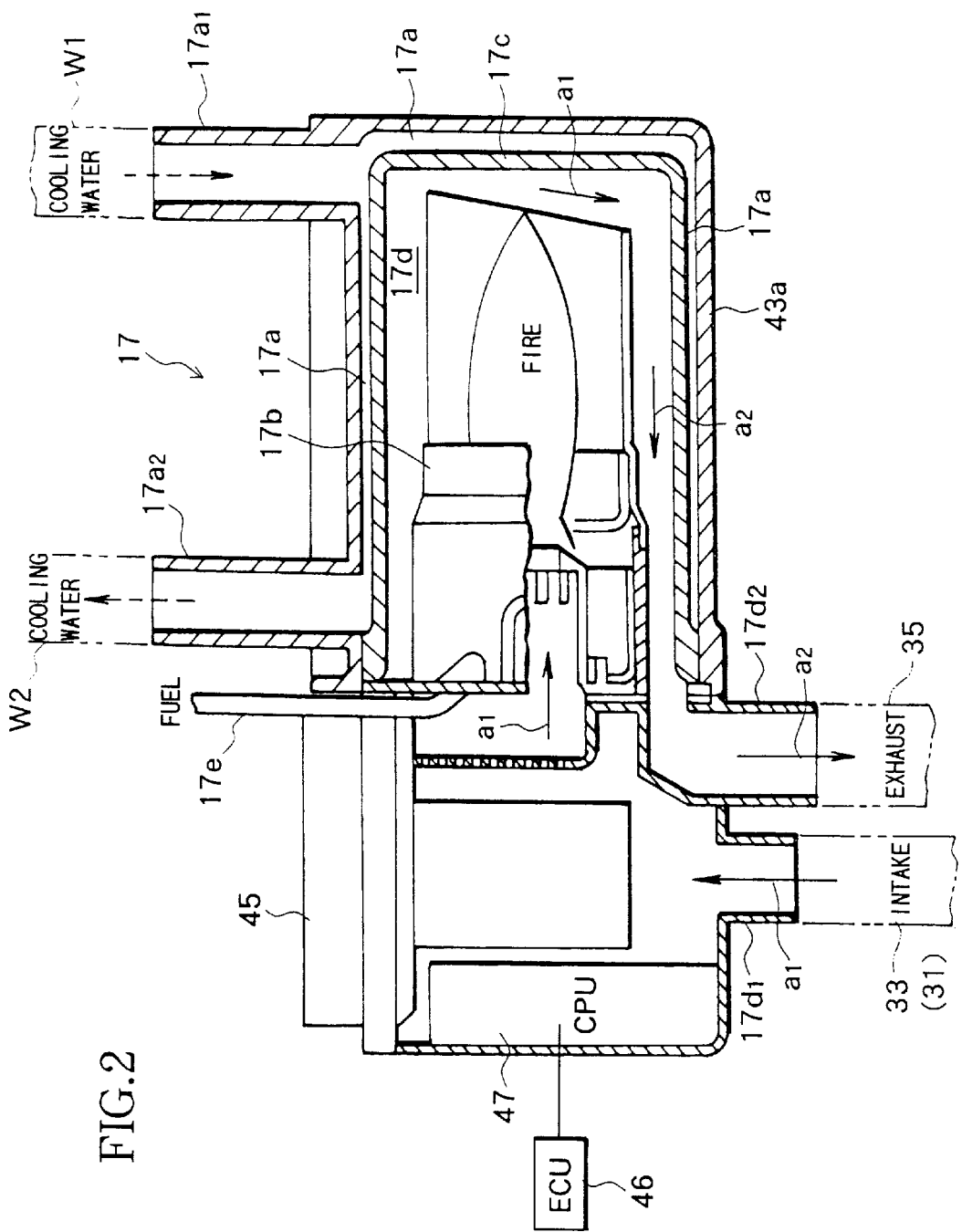
FIG. 2 is a sectional view schematically illustrating the combustion heater.

Next, FIG. 2 schematically illustrates a structure of the combustion heater 17.

The combustion heater 17 is linked to the water jacket of the engine body 3 and includes inside a cooling water passageway 17a through which the cooling water from the water jacket flows. The cooling water (indicated by a broken arrow-line) flowing via the cooling water passageway 17a runs around a combustion chamber 17d defined as a combustion unit formed inwardly of the combustion heater 17, during which time the cooling water receives the heat from the combustion chamber 17d and is thus warmed up. This process will be sequentially explained in greater details.

The combustion chamber 17d is constructed of a combustion cylinder 17b serving as a combustion source from which emit a flame, and a cylindrical partition wall 17c for covering the combustion cylinder 17b and thus preventing the flame from spreading outside. The combustion cylinder 17b is covered with the partition wall 17c, whereby the combustion chamber 17d is defined inside by the partition wall 17c. Then, this partition wall 17c is also covered with an outer wall 43a of the combustion heater 17, and there is a spacing therebetween. With this spacing, the cooling water passageway 17a is formed between an internal surface of the outer wall 43a and an external surface of the partition wall 17c.

Further, the combustion chamber 17d has an air supply port 17d1 and an exhaust gas discharge port 17d2, which are respectively connected directly to the air supply passageway 33 and to the combustion gas discharge passageway 35. The air al coming from the air supply passageway 33 enters the combustion chamber 17d via the air supply port 17d1 and arrives, after flowing therethrough, at the exhaust gas discharge port 17d2. Thereafter, as described above, the air al flows as the air a2 into the main pipe 29 via the combustion gas discharge passageway 35. Hence, the combustion chamber 17d is formed as an air passageway through which to flow the air al changed into the air a2 by its being burned in the combustion heater 17.

Then, the air a2, which is returned to the main pipe 29 via the combustion gas discharge passageway 35 after being burned in the combustion heater 17, is the so-called exhaust gas discharged from the combustion heater 17 and therefore assumes the heat. Then, the air a2 holding the heat is discharged from the combustion heater 17, during which time the heat of the air a2 is transmitted via the partition wall 17c to the cooling water flowing inside the cooling water passageway 17a and, as explained above, warms up the cooling water. Therefore, the combustion chamber 17d serves also as a heat exchange passageway.

Note that the combustion cylinder 17b includes a fuel go supply pipe 17e connected to an unillustrated fuel pump. A fuel for combustion is, upon receiving a pump pressure of the fuel pump, supplied to the combustion cylinder 17b from the fuel supply pipe 17e. The supplied fuel for combustion is vaporized within the combustion heater 17, thereby becoming a vaporized fuel. The vaporized fuel is ignited by an unillustrated ignition source.

It is to be noted that the air supply passageway 33 and the combustion gas discharge passageway 35 are used for only the combustion heater 17 and may be therefore classified as members belonging to the combustion heater 17.

Next, a circulation of the cooling water will be explained.

The cooling water passageway 17a has a cooling water intake port 17a1 connected to the water jacket and a cooling water discharge port 17a2 connected to the car room heater 9.

A water conduit W1 is provided between the cooling water intake port 17a1 and the engine body 3, and a water conduit W2 is connected to between the cooling water discharge port 17a2 and the car room heater 9.

The combustion heater 17 is connected through these water conduits W1, W2 to the water jacket of the engine body 3 and to the car room heater 9. Further, the car room heater 9 is also connected via a water conduit W3 to the engine body 3.

Accordingly, the cooling water in the water jacket of the engine body 3 flows, as a flowing sequence (1), to the combustion heater 17 from the cooling water intake port 17a1 via the water conduit W1, so that the cooling water is warmed up in the combustion heater 17. The warmed water flows, as a flowing sequence (2), to the car room heater 9 from the cooling water discharge port 17a2 of the combustion heater 17 via the water conduit W2. The water then returns, as a flowing sequence (3), to the water jacket via the water conduit W3 after the water has been subjected to the heat-exchange in the car room heater 9 with its temperature decreased.

Thus, the cooling water is circulated between the engine body 3, the combustion heater 17 and the car room heater 9 via the water conduits W1, W2, W3.

Further, the combustion chamber body incorporates, in addition to the above components, a blowing fan and a central processing unit (CPU) 47 for controlling the combustion heater 17, which is separated from an engine electronic control unit (ECU) 46. The CPU 47 may not be, however, provided.

The ECU 46 is electrically connected via the CPU 47 to the outside air temperature sensor 32, the combustion gas temperature sensor 36, a rotational-speed sensor 59, the blowing fan 45 and the fuel pump. Note that the ECU 46 is, if the CPU 47 is not provided, electrically connected directly to the combustion gas temperature sensor 36, the number-of-rotations sensor 59, the blowing fan 45 and the fuel pump. Then, the CPU 47 of the combustion heater 17 operates in accordance with parameters of the sensors 32, 36, 59, thereby controlling a combustion state of the combustion heater 17. In other words, a force, a magnitude and a temperature of the flame of the combustion heater 17 are controlled, and, with this control, a temperature of the exhaust gas (combustion gas) of the combustion heater 17 is controlled. Further, if the CPU 47 is not provided, the combustion state of the combustion heater 17 is directly controlled by the unillustrated CPU of the ECU 46.

The temperatures detected by the outside air temperature sensor 32 and the combustion gas temperature sensor 36, are referred to as a fresh air temperature and a combustion heater exhaust gas temperature respectively before being mixed with the combustion gas, and are indicated by T1 and T2, respectively. A random access memory RAM of the ECU 46 is temporarily stored with the fresh air temperature T1 and the combustion heater exhaust gas temperature T2 before the mixing with the combustion gas, and as explained above these temperatures are appropriately invoked to the CPU 47 when predicting a temperature of the combustion gas mixed intake air. Furthermore, if the CPU 47 is not provided, those temperatures are invoked to an unillustrated CPU inside the ECU 46.

Figure 4:
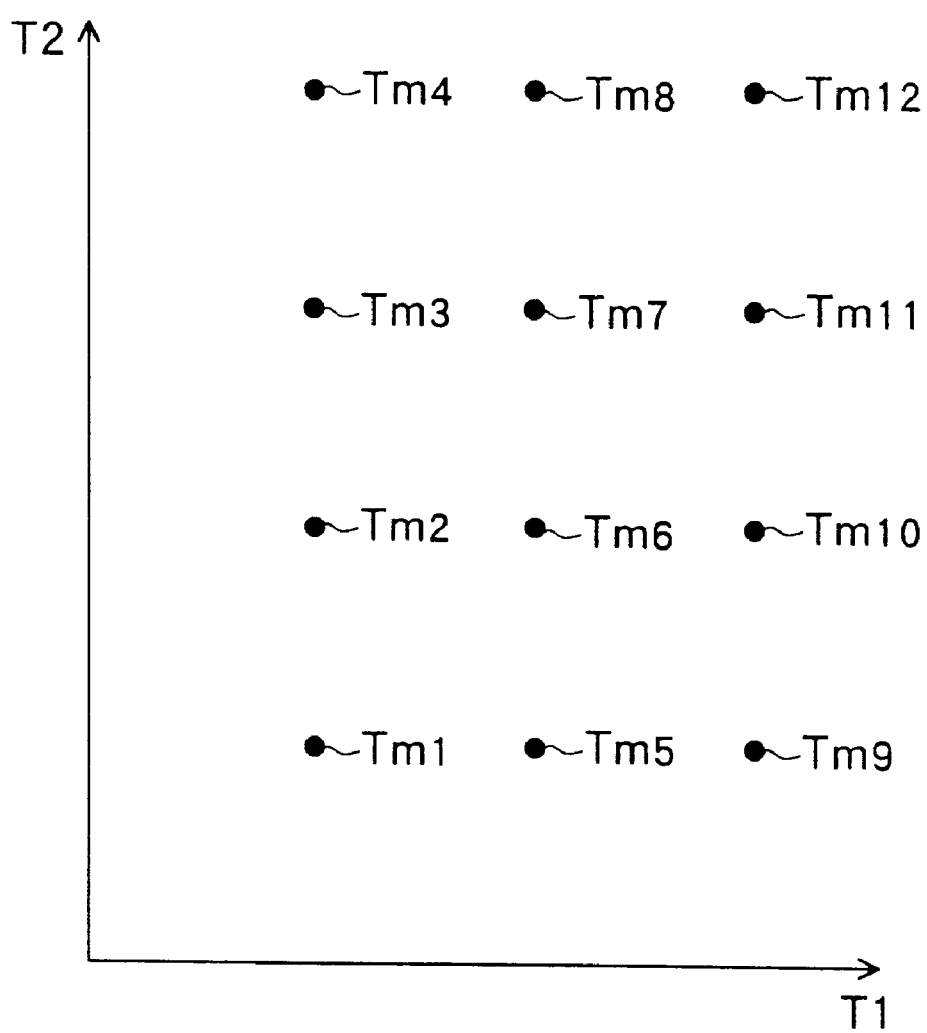
FIG. 4 is a chart showing a combustion gas mixed intake air temperature prediction map.

Then, an unillustrated read-only memory of the ECU 46 is stored with a combustion gas mixed intake air temperature prediction map M as shown in FIG. 4. The map M is prepared for predicting a temperature of the intake air after being mixed with the combustion gas, and is created based on a relationship between the fresh air temperature T1 and the combustion heater exhaust gas temperature T2 after measuring a multiplicity of temperatures of the intake air after being mixed with the combustion gas. Note that the temperature of the intake air after being mixed with the combustion gas is hereinafter termed a combustion gas mixed intake air temperature if not particularly notified.

Next, a method of predicting the combustion gas mixed intake air temperature will be explained.

The map M is a "Combustion Heater Exhaust Gas Temperature—Intake Air Temperature Diagram", wherein the axis of ordinates indicates the combustion heater exhaust gas temperature T2, and the axis of abscissa indicates the intake air temperature Ti. Cross points Tm1, Tm2, . . . of a plurality of temperatures T2, T1, which are exemplified in this diagram, imply predicted temperatures of the combustion gas mixed intake air temperature. Note that since there are the multiplicity of cross points Tm1, Tm2, . . . , and hence these cross points are generically called Tm. The map M implies that the cross points Tm are proportional to T2 or/and T1.

Here, even if T2 with a given rotational speed takes the same value as T2 with a different rotational speed, and even if T1 with the given rotational speed takes the same value as T1 with the different rotational speed, it proves from the tests by the inventors that the predicted temperature Tm becomes different when a rotational speed Ne differs. Accordingly, for obtaining the predicted temperature Tm suited to the rotational speed Ne, there are prepared a plurality of the combustion gas mixed intake air temperature maps M corresponding to every rotational speed such as, e.g., 1000 rpm, 2000 rpm and so on.

Thus, the combustion gas mixed intake air temperature is predicted by utilizing the combustion gas mixed intake air temperature maps M, and hence the ECU 46 having the read-only memory ROM stored with the maps M is called a mixed intake air temperature predicting unit.

Further, the predicted temperature Tm is obtained also by using an arithmetic formula instead of the maps M.

The following equation (1) is what is called herein the arithmetic formula.

$$Tm=\{(1-\alpha)T1+k\alpha T2\}/(1-\alpha+k\alpha) \quad (1)$$

According to the equation (1), the fresh air temperature T1 before being mixed with the combustion gas, the combustion heater exhaust gas temperature T2 and the rotational speed Ne are variables, and the predicted temperature Tm of the combustion gas mixed intake air is obtained based on these variables.

In the above equation (1), however, a is the quantity of the fresh air diverging from the main pipe 29 to the air supply passageway 33 and supplied for the combustion by the combustion heater 17, and is given such as $\alpha=\alpha 0/Ne$, where $\alpha 0$ is the compensation constant when the rotational speed differs and is preferably set to a numerical value on the order of 0.2 in an empirical sense.

In the equation (1), k is the compensation constant determined by considering an existence of a combustion gas $\alpha'$ because of the fact that when the fresh air quantity $\alpha$ is supplied for the combustion upon an operation of the combustion heater 17, the combustion gas $\alpha'$ having a mass greater than a due to a combustion of the combustion fuel is emitted out of the combustion heater 17.

When obtaining the predicted temperature Tm using the equation (1), the read-only memory ROM is stored with the equation (1) replacing the maps M.

Hence, the ECU 46 may be defined as a combustion gas mixed intake air temperature calculating unit including the arithmetic formula for calculating the predicted temperature of the combustion gas mixed intake air. Note that a concept of the calculation shall embrace the case of using the maps and the case of using the arithmetic formula.

What has been describes so far is the internal combustion engine 1 having the combustion heater in accordance with the first embodiment.

Figure 3:
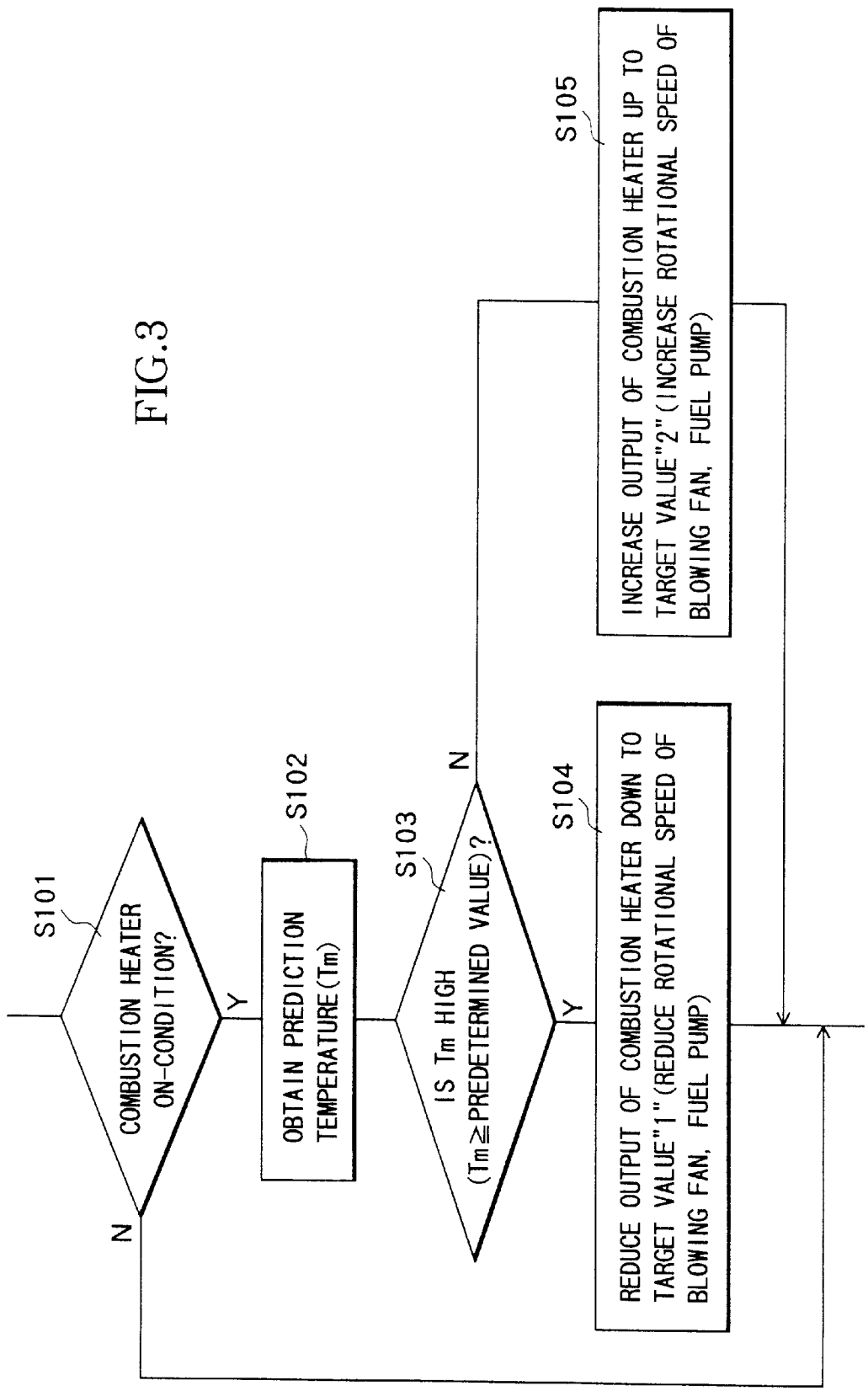
FIG. 3 is a flowchart showing an operation control routine in the first embodiment in FIG. 1.

Next, an operation control routine of an exhaust control device A1 of the internal combustion engine will be explained with reference to FIG. 3.

This control routine is a part of a normal flowchart (not shown) when driving the engine 1, and consists of steps 101–105 which will hereinafter be described. Further, all the operation in the following procedures are performed by the ECU 46. Note that the steps are abbreviated such as S101 in the case of, e.g., the step 101.

After starting the engine 1, the processing moves to this routine. In S101, it is judged whether or not the engine 1 is in an operation state needed for actuating the combustion heater 17. Note that the actuation of the combustion heater 17 implies switching ON the combustion heater 17.

The time when the engine 1 is in the operation state needed for switching ON the combustion heater 17 may include a time when the engine is on the operation or after starting up the engine 1 at a cold time or at an extremely cold time, and when a heating value from the engine body 3 itself is small (e.g., a burned fuel quantity is small) as well as when a heat receiving value of the cooling water is thereby small. Then, the cold time implies that the outside air temperature is −10° C. to 15° C., and the extremely cold time implies that the outside air temperature is lower than −10° C.

If judged to be affirmative in S101, the processing advances to next S102. Whereas if judged to be negative, this routine is ended. The negative judgement may be, for instance, a case of having no necessity for speeding up the warm-up of the internal combustion engine by operating the combustion heater 17 or for warming the interior of the car room of the vehicle mounted with the engine 1 by use of the car room heater 9 because of the outside air temperature being high.

In S102, the predicted temperature Tm corresponding to the rotational speed Ne is obtained from the maps M schematically shown in FIG. 4 or from the equation (1).

After the predicted temperature Tm has been obtained in S102, the processing proceeds to S103.

It is judged in S103 whether or not the predicted temperature Tm is over a predetermined value. The predetermined value given herein is a combustion gas mixed intake air temperature enough to cause a thermal damage to the structure of intake system.

If Tm≧the predetermined value, the judgement is affirmative, and the processing advances to S104. Whereas if not, the judgement is negative, and the processing proceeds to S105.

In S104, since it must be a trouble that the predicted combustion gas mixed intake air temperature is high enough to cause the thermal damage to the intake system structure, the output of the combustion heater 17 is reduced down to a target value "1". The target value "1" is defined as a specified set value so that the above temperature becomes such a combustion gas mixed intake air temperature as to cause no thermal damage to the structure of intake system by, e.g., decreasing a pressure of the fuel pump relative to the fuel supply pipe 17e for supplying the combustion heater 17 with the fuel for combustion or by decreasing the rotational speed of the blowing fan 45 under the control of the CPU 47 or under the control of the ECU 46 if the CPU 47 is not provided in order to reduce the output of the combustion heater 17.

The target value "1" given herein is an output value of the combustion heater 17, which is enough not to cause the thermal damage to the structure of intake system due to the combustion gas mixed intake air temperature in the case of using, when the outside air temperature is highest enough to make the driver and persons riding together feel it necessary to use the combustion heater 17, i.e., 15° C. at the cold time, the outside air having this temperature as the air for combustion in the combustion heater 17.

In S105, the predicted combustion gas mixed intake air temperature is not enough to cause the thermal damage to the structure of intake system, and therefore the output value of the combustion heater 17 is increased up to a target value "2" higher than the target value "1" so that the warm-up of the engine 1 is speeded up and a temperature of hot air coming from the car room heater 9 is increased as quickly as possible.

Explained next are the operation and effect of the internal combustion engine A1 having the combustion heater in the first embodiment.

In the internal combustion engine A1 having the combustion heater, at the cold time or extremely cold time, the combustion heater 17 operates during the operation of the engine 1 or after actuating the engine 1, and when the heating value from the engine body 3 itself is small (e.g., when the burned fuel quantity is small) and when the heat receiving value of the cooling water is thereby small. The combustion gas a2 emitted from the thus operated combustion heater 17 is mixed into the main pipe 29 of the intake passageway 23 of the engine 1, whereby the high-temperature combustion gas mixed intake air a3 assuming the combustion heat of the combustion gas flows through the main pipe 29.

Then, before the combustion gas mixed intake air a3 enters the engine body 3, the combustion gas mixed intake air temperature Tm is predicted, and the combustion state of the combustion heater 17 is controlled based on the predicted temperature Tm, more precisely, the value indicated by the temperature Tm. Hence, if this control is preferably carried out, it is feasible to restrain an excessive rise in the intake system temperature due to the combustion heat while speeding up the warm-up and enhancing the performance of the car room heater 9 by utilizing the combustion heat of the combustion heater 17. It is therefore possible to prevent the thermal damage to the structure of intake system. Then, the combustion gas mixed intake air temperature Tm is obtained by the calculation considering the rotational speed (intake air quantity) and may be therefore precise corresponding to the operation state of the engine 1 at the time concerned.

Further, the warm-up is speeded up by using the combustion gas a2 of the combustion heater 17 which produces almost no smokes, in other words, contains no carbon, so that the durability of the engine 1 is, it can be expected, also enhanced.

Moreover, since the combustion gas discharge passageway 35 of the combustion heater 17 communicates with the main pipe 29, the combustion gas of the combustion heater 17, when reaching the discharge pipe 42 after being burned in the engine 1, is purified by the exhaust catalyst 39 normally provided in the exhaust pipe 42, and hence there is no necessity for specially providing an equipment for purifying the combustion gas of the combustion heater 17.

Furthermore, the apertures of the air supply passageway 33 and of the combustion gas discharge passageway 35 of the combustion heater 17 are not exposed directly to the atmospheric air, and therefore an effect of reducing the noises can be expected.

<Second Embodiment>

Figure 5:
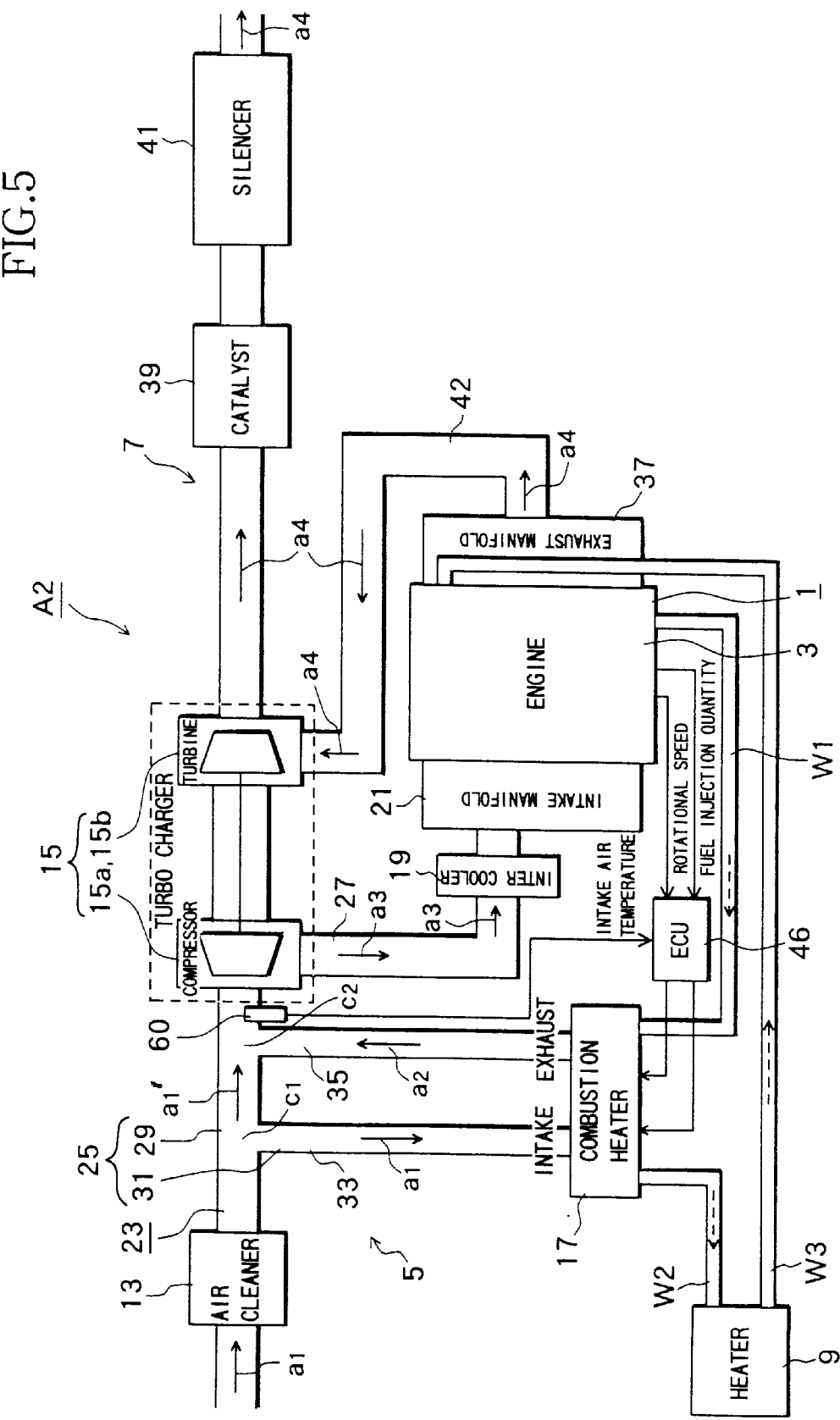
FIG. 5 is a schematic diagram showing a second embodiment of the internal combustion engine having the combustion heater according to the present invention.
Figure 6:
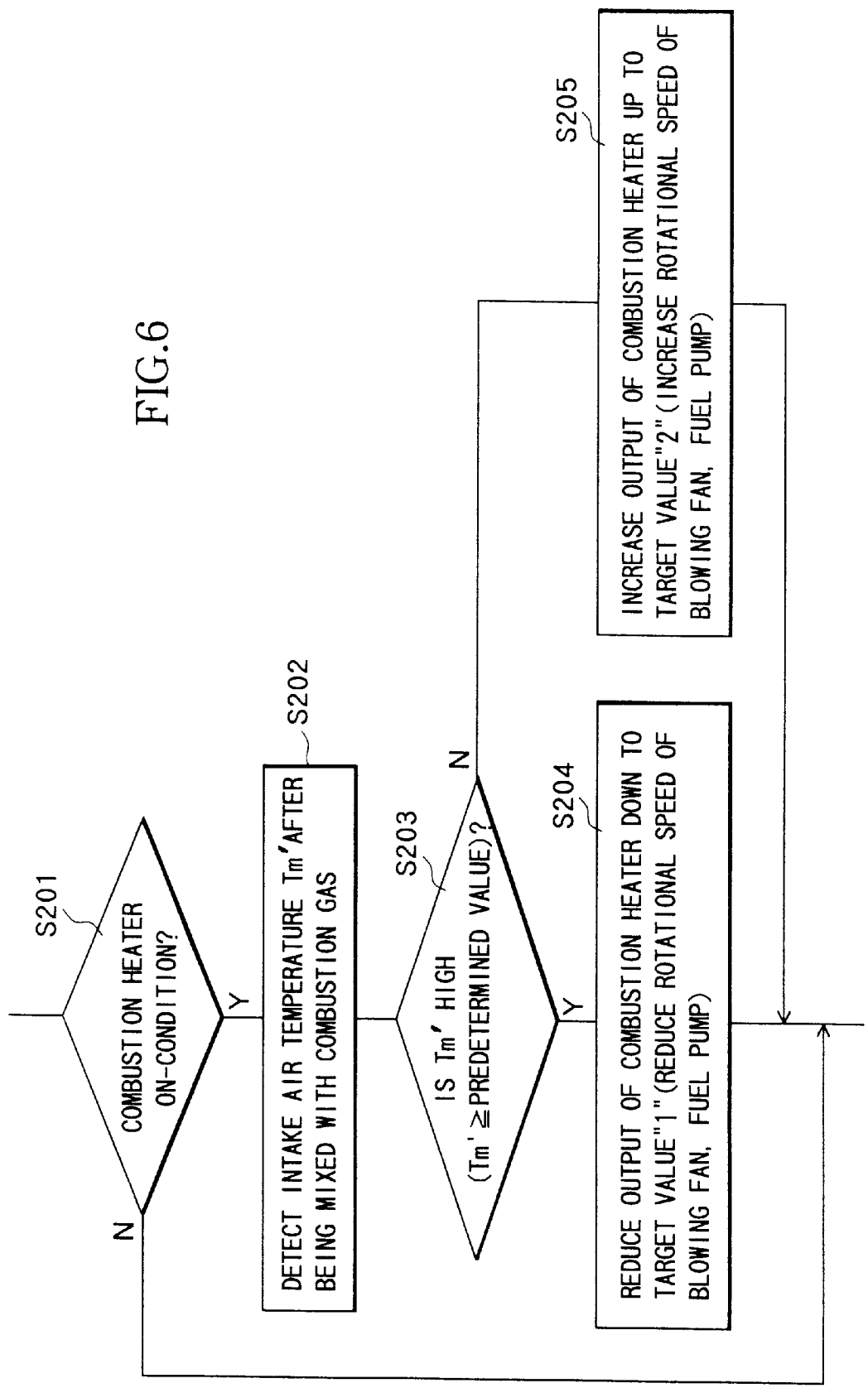
FIG. 6 is a flowchart showing an operation control routine in the second embodiment in FIG. 5.

A second embodiment of the present invention will hereinafter be discussed with reference to FIGS. 5 and 6.

The internal combustion engine having the combustion heater in the second embodiment is designated by the reference symbol A2.

A difference of the internal combustion engine A2 having the combustion heater from the internal combustion engine A1 having the combustion heater in the first embodiment, is such a point that a intake air temperature after being mixed with the combustion gas is not predicted but actually measured, and the combustion state of the combustion heater is controlled based on this measured value. With this difference, the construction thereof is slightly different therefrom. Hence, the explanation is concentrated upon only the different point, and the like components are marked with the like reference symbols with an omission of the explanation thereof.

The internal combustion engine A2 having the combustion heater includes neither the outside air temperature sensor 32 nor the combustion gas temperature sensor 36 of the internal combustion engine A1 having the combustion heater in the first embodiment, but instead includes a mixed gas intake air temperature detection sensor 60 for detecting a combustion gas mixed intake air temperature, which is provided in a proper portion located in the vicinity and downstream of the connecting point c2 between the combustion gas discharge passageway 35 and the main pipe 29. Another different point is that a value of the injection quantity of the fuel injected into the cylinders of the engine body 3 is inputted as a piece of data to the ECU 46. Herein, the fuel injection quantity is used as a substitute parameter for the intake air quantity in the first embodiment. Further, the intake air quantity is a value determined by the rotational speed and an accelerator aperture.

Next, an operation control routine of an exhaust control device A2 of the internal combustion engine will be explained with reference to FIG. 6. This control routine is also a part of a normal flowchart (not shown) when driving the engine 1, and consists of steps 201–205 which will hereinafter be described.

After starting the engine 1, the processing moves to this routine. In S201, it is judged whether or not the engine 1 is in the operation state needed for actuating the combustion heater 17.

The description about whether or not the engine 1 is in the operation state needed for switching ON the combustion heater 17 is the same as in the first embodiment. Note that this is the same with other embodiments which will be discussed later on.

If judged to be affirmative in S201, the processing advances to next S202. Whereas if judged to be negative, this routine is ended. The negative judgement may be, for instance, a case of having no necessity for speeding up the warm-up of the internal combustion engine by operating the combustion heater 17 or for warming the interior of the car room of the vehicle mounted with the engine 1 by use of the car room heater 9 because of the outside air temperature being high.

In S202, a mixed intake air temperature Tm' of the fresh air with the combustion gas of the combustion heater 17 is obtained based on an actual measurement by use of the mixed gas intake air temperature detection sensor 60. This mixed gas intake air temperature Tm' is inputted to the RAM of the ECU 46.

After obtaining the mixed gas intake air temperature Tm' in S202, the processing advances to S203.

It is judged in S203 whether or not the mixed gas intake air temperature Tm' is over a predetermined value. The predetermined value given herein is a combustion gas mixed intake air temperature enough to cause the thermal damage to the structure of intake system.

If Tm'≧the predetermined value, the judgement is affirmative, and the processing advances to S204. Whereas if not, the judgement is negative, and the processing proceeds to S205.

Steps S204 and S205 corresponds to S104 and S105 in the first embodiment, and hence the explanation thereof is omitted.

The internal combustion engine A2 having the combustion heater in the second embodiment exhibits the following operation and effect while enhancing the performance of the car room heater and speeding up the warm-up by utilizing the combustion heater of the combustion heater 17 as in the case of the internal combustion engine A1 having the combustion heater in the first embodiment.

To be specific, in the internal combustion engine A2 having the combustion heater, there is actually measured the combustion gas mixed intake air temperature Tm' after the combustion gas of the combustion heater 17 has been mixed with the fresh air, and the combustion state of the combustion heater 17 is controlled based on this measured value. It is therefore feasible to restrain an excessive rise in the intake system temperature more precisely than in the predicted temperature Tm in the internal combustion engine A1 having the combustion heater in the first embodiment. Accordingly, the thermal damage to the structure of intake system is more effectively prevented. Note that if the accuracy of the predicted temperature Tm is enhanced in the first embodiment, as a matter of course, the excessive rise in the intake system temperature can be restrained without any inferiority.

<Third Embodiment>

Figure 7:
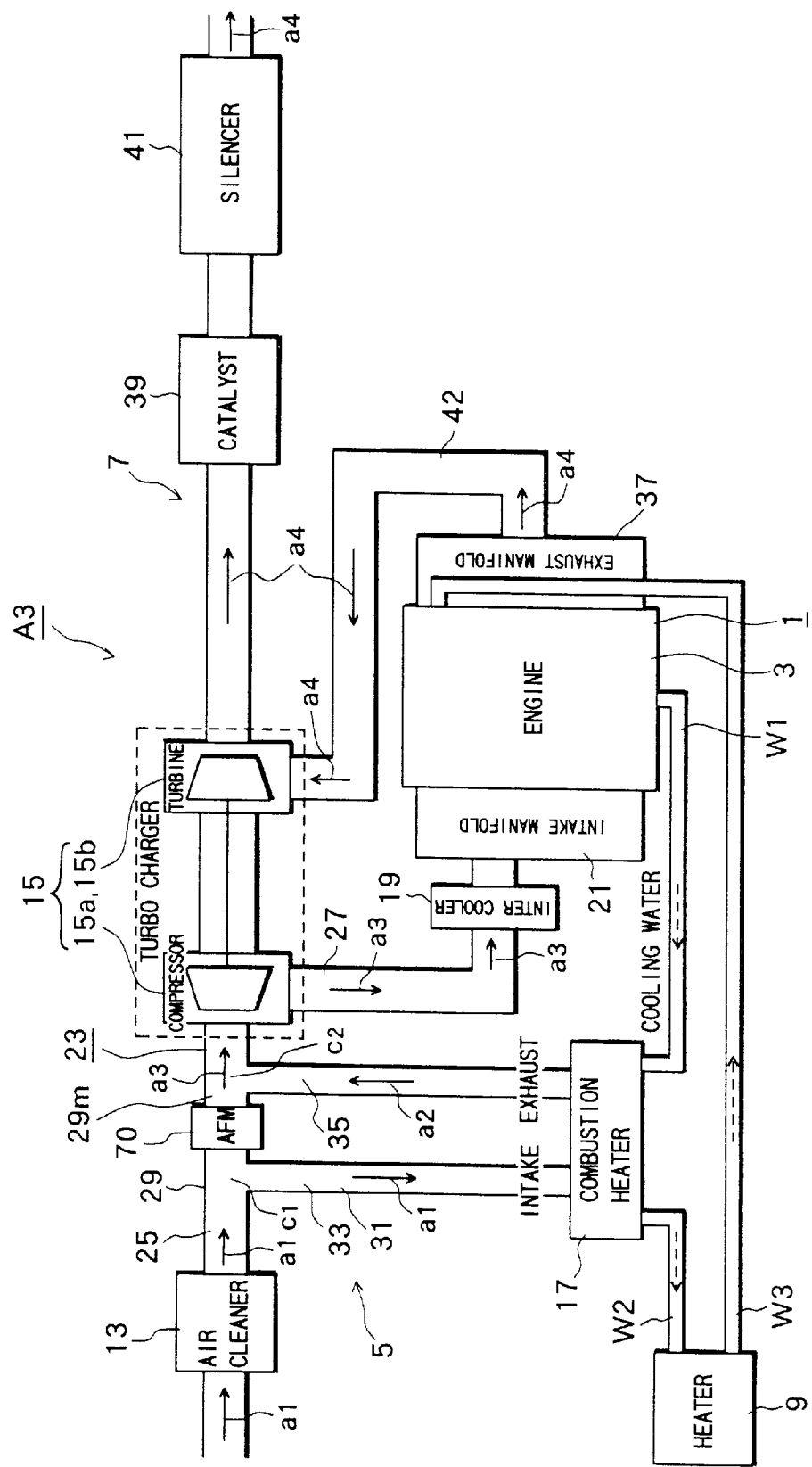
FIG. 7 is a schematic diagram showing a third embodiment of the internal combustion engine having the combustion heater according to the present invention.

A third embodiment of the present invention will be described referring to FIG. 7.

The internal combustion engine having the combustion heater in the third embodiment is designated by the reference symbol A3. A difference of the internal combustion engine A3 having the combustion heater from the internal combustion engines A1, A2 each having the combustion heater in the first and second embodiments, is only the point that an air flow meter 70 is provided at a portion of the main pipe 29 between the connecting points c1 and c2 of the air supply passageway 33 and the combustion gas discharge passageway 35 to the main pipe 29, in other words, at a portion disposed upstream of the connecting point c2 of the combustion gas discharge passageway 35 to the main pipe 29. Hence, this construction can be applied to both of the internal combustion engines A1, A2 having the combustion heaters in the first and second embodiments. Herein, however, the explanation of the essential point is given in terms of a necessity for simplifying the description. The like components throughout the internal combustion engines A1, A2 having the combustion heaters are marked with the like reference symbols with an omission of the explanation thereof. Further, the Figures are also confined to the minimum required for the explanation.

Herein, the combustion heater 17 is, as described above, connected in bypass to the main pipe 29 via the air supply passageway 33 and the combustion gas discharge passageway 35.

The air flow meter is generally defined as an air resisting structure which hinders the flow of the air flowing through the intake passageway, and therefore a pressure of the air out of the air flow meter is smaller than a pressure of the air entering the air flow meter. Namely, the air flow meter produces a difference in the air pressure between the inlet and the outlet thereof.

The air flow meter 70 as the intake resistance structure with the air pressure difference produced between the inlet and the outlet thereof, is provided at a portion along the main line with respect to the combustion heater 17 connected in bypass to the main pipe 29, more specifically at a portion 29m of the main pipe 29 between the connecting point c1 of the air supply passageway 33 to the main pie 29 and the connecting point c2 of the combustion gas discharge passageway 35 to the main pipe 29. In this case, there might be a large pressure difference between the connecting points C1 and C2, i.e., between the inlet of the air supply passageway 33 and the outlet of the combustion gas discharge passageway 35, and hence an air flow velocity in the combustion chamber 17d of the combustion heater 17 located between the air supply passageway 33 and the combustion gas discharge passageway 35, becomes excessive, with the result that an ignition characteristic might decline.

Such being the case, the air flow meter used in the third embodiment is constructed as, e.g., a hot wire type or a film type air flow meter causing a less pressure difference between the inlet side and the outlet side.

The internal combustion engine A3 having the combustion heater in the third embodiment exhibits the following operation and effect as well as exhibiting the same operations and effects as those of the internal combustion engines A1, A2 having the combustion heaters.

In the internal combustion engine A3 having the combustion heater, the air flow meter 70 is, as explained above, the how wire type or film type air flow meter in with the smaller pressure difference between the inlet side and the outlet side. Therefore, even when the air flow meter 70 as the air resisting structure is provided at the portion of the main pipe 29 between the connecting points C1 and C2 of the air supply passageway 33 and the combustion gas discharge passageway 35 to the main pipe 29, it never happens that the air flow velocity in the combustion heater 17 increases due to this construction, and therefore the ignition does not become difficult to attain. Further, since only the fresh air quantity of the internal combustion engine excluding the air quantity for combustion in the combustion heater 17 can be measured, the air/fuel ratio in the combustion chamber 17d of the engine 1 can be accurately set, and it is possible to enhance the controllability of the engine 1 and reduce the emission.

<Fourth Embodiment>

Figure 8:
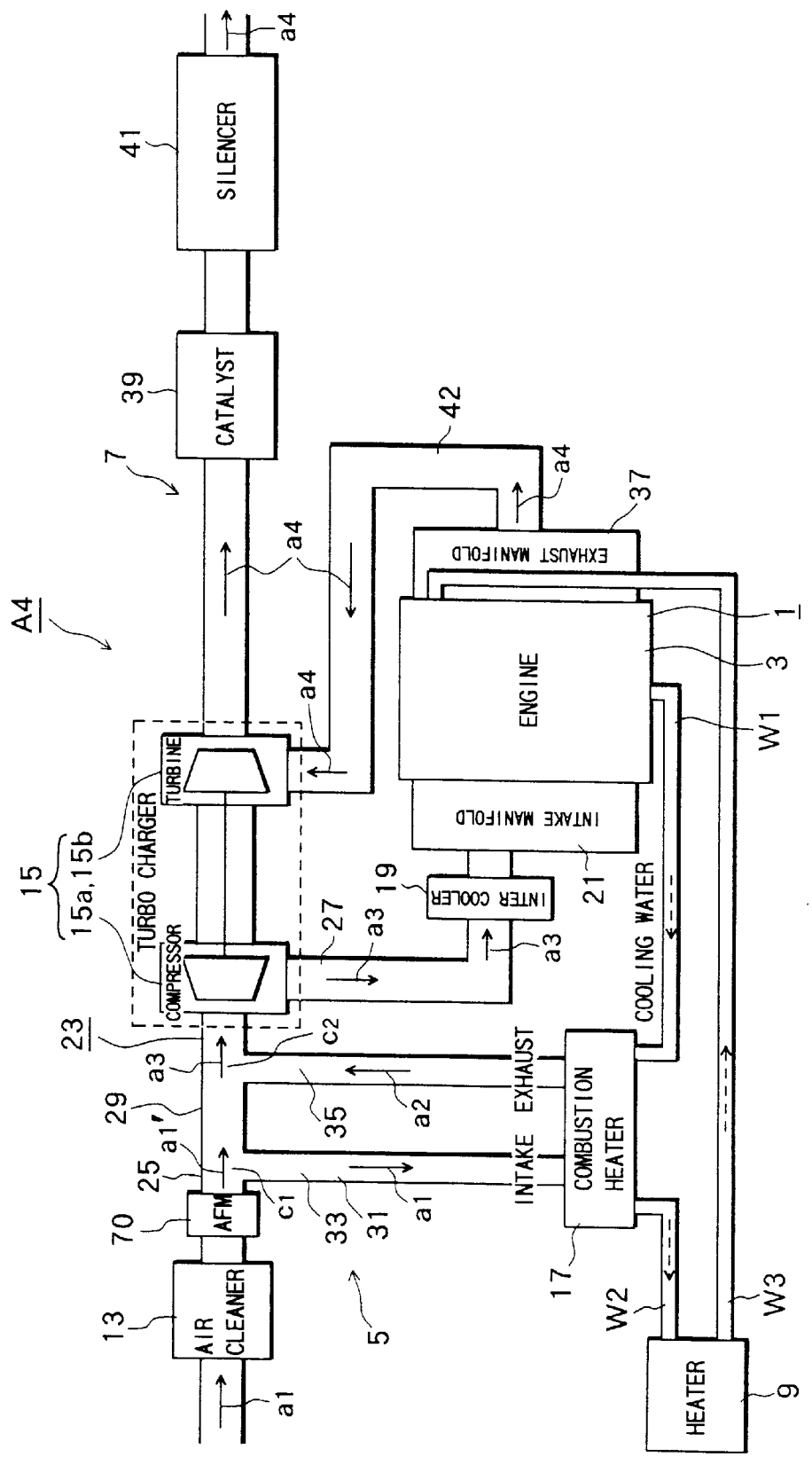
FIG. 8 is a schematic diagram showing a fourth embodiment of the internal combustion engine having the combustion heater according to the present invention.

A fourth embodiment of the present invention will be discussed with reference to FIG. 8.

The internal combustion engine having the combustion heater in the fourth embodiment is designated by the reference symbol A4. A difference of the internal combustion engine A4 having the combustion heater in the fourth embodiment from the internal combustion engine A3 having the combustion heater in the third embodiment is only the point that the air flow meter 70 is disposed upstream of the connecting point c1. Therefore, other like components are the marked with the like symbols, and the explanation thereof is omitted.

The internal combustion engine A4 having the combustion heater in the fourth embodiment is, as compared with the internal combustion engine A3 having the combustion heater in the third embodiment, constructed such that the air flow meter 70 is, as described above, disposed upstream of the connecting point c1. Accordingly, the applicable air flow meter may also be of such a type that there is a pressure difference between the inlet side and the outlet side. It is because the flow velocity of the air flowing inside the combustion heater 17 connected in bypass to the main pipe 29 becomes substantially constant irrespective of the operation state of the engine 1 by virtue of where the air flow meter 70 is disposed, and the ignition of the combustion heater 17 can be thereby made preferable.

To described it in greater details, the air flow meter 70 as the air intake resisting structure is not provided between the connecting point c1 serving as an inlet portion from the main pipe to the combustion heater 17 connected in bypass to the main pipe 29 via the air supply passageway 33 and the combustion gas discharge passageway 35, and the connecting point c2 serving as an outlet portion from the combustion heater 17 to the main pipe 29. Consequently, substantially the same pressure as the pressure acting on the outlet side of the air flow meter 70, might act upon the connecting point c1 and the connecting point c2 as well. Hence, the pressure difference between the connecting points c1 and c2 is, if any, small enough to be ignorable. Accordingly, in the interior of the combustion heater 17 connected to the connecting point c2 via the combustion gas discharge passageway 35 as well as being connected to the connecting point c1 via the air supply passageway 33, the flow velocity of the air flowing therethrough, i.e., a ventilation velocity, is substantially constant without a large change thereof. Therefore, the desirable ignition can be expected because of no difficulty of the ignition of the combustion heater 17. Hence, there may also be adopted the air flow meter of such a type as to produce the pressure difference between the inlet side and the outlet side thereof.

<Fifth Embodiment>

Figure 9:
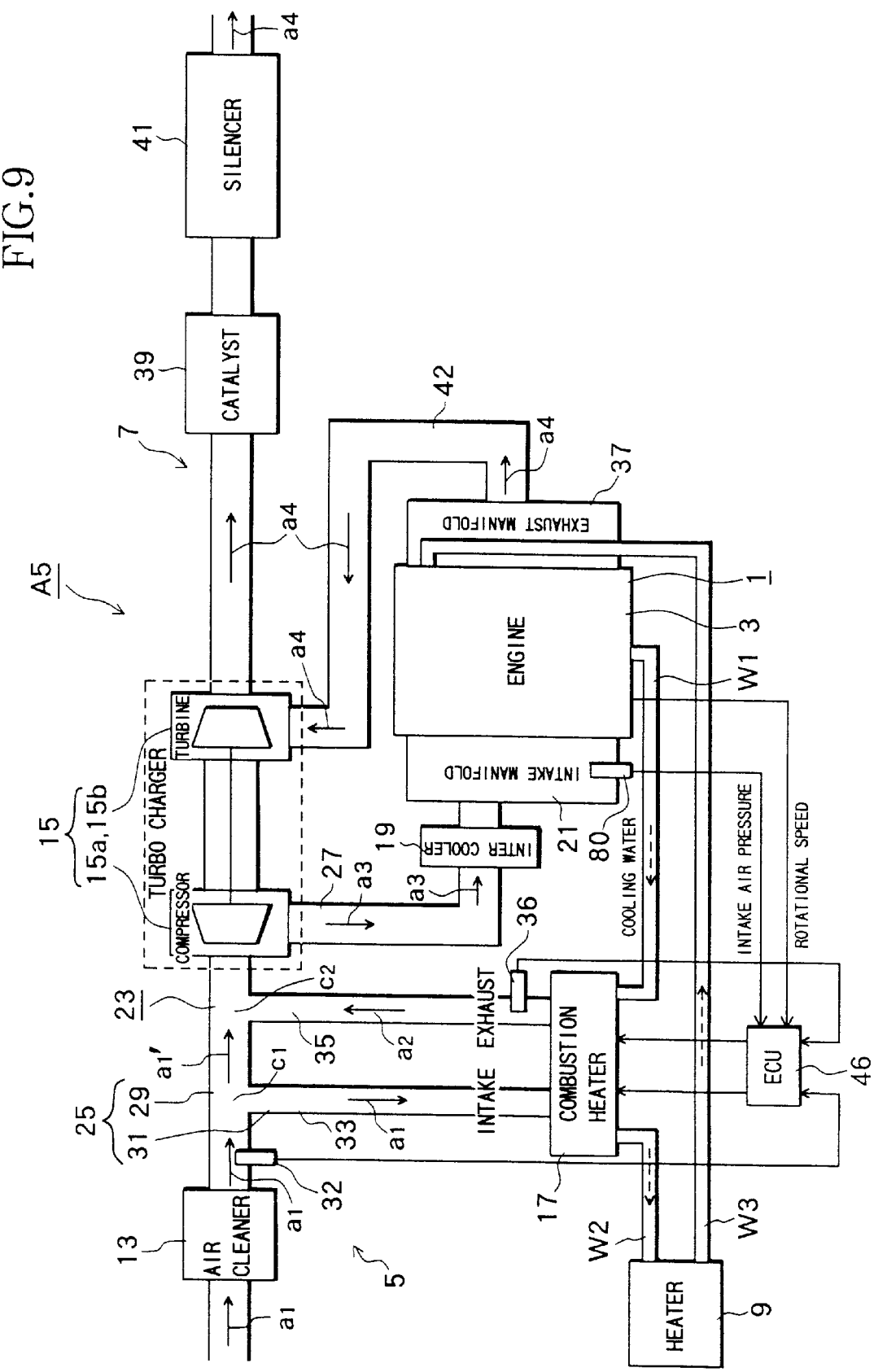
FIG. 9 is a schematic diagram showing a fifth embodiment of the internal combustion engine having the combustion heater according to the present invention.
Figure 10:
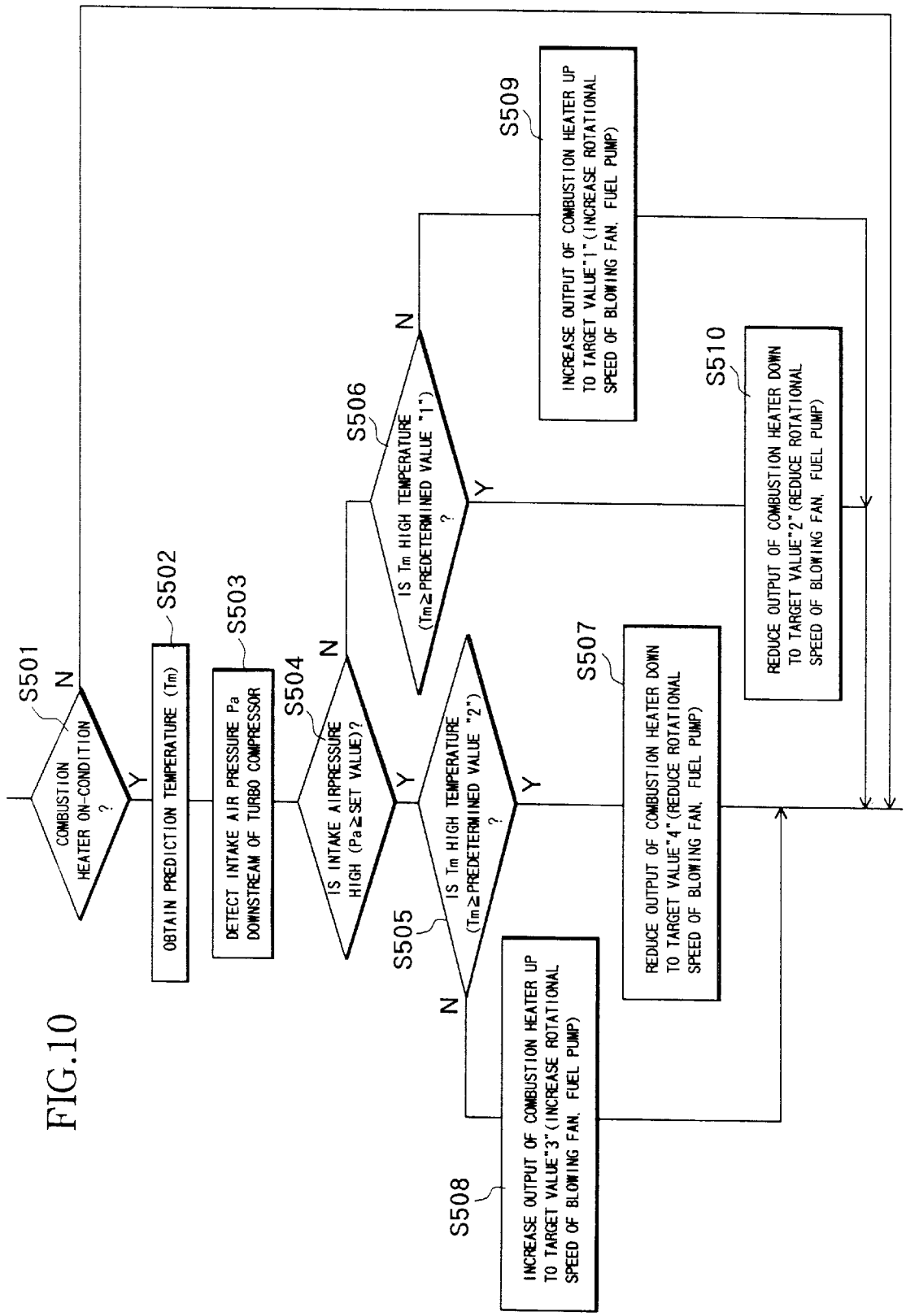
FIG. 10 is a flowchart showing an operation control routine in the fifth embodiment in FIG. 9.

A fifth embodiment of the present invention will be discussed referring to FIGS. 9 and 10.

The internal combustion engine having the combustion heater in the fifth embodiment is designated by the reference symbol A5. A difference of the internal combustion engine A5 having the combustion heater in the fifth embodiment from the internal combustion engine A1 having the combustion heater in the first embodiment is such a point that the intake manifold 21 having an intake air pressure sensor 80 is added to the construction of the internal combustion engine A1 having the combustion heater, and an intake air pressure detected by the intake air sensor is inputted to the ECU 46 to make the combustion state of the combustion heater 17 more preferably controllable.

In the internal combustion engine A5 having the combustion heater in the fifth embodiment also, the same components as those of the internal combustion engine A1 having the combustion heater in the first embodiment, are marked with the like symbols with an omission of the explanation thereof.

An operation control routine of the internal combustion engine A5 having the combustion heater will be explained with reference to FIG. 10. Note that this control routine is also a part of a normal flowchart (not shown) when driving the engine 1, and consists of steps 501–510 which will hereinafter be described. Further, a difference from the routine shown in FIG. 3 with respect to the internal combustion engine A1 having the combustion heater is an addition of steps needed for the ECU 46 to control more preferably the combustion state of the combustion heater 17 on the basis of a detected value by the intake air pressure sensor 80, whereby the output of the combustion heater 17 is controlled more precisely.

The routine is hereinafter explained.

The judgements made in S501 and in S502 are substantially the same as those in S101 and S102 in the first embodiment, and hence their explanation is omitted. The description start with S503.

In S503, the intake air pressure sensor 80 detects a intake air pressure Pa at the intake manifold 21 disposed downstream of the compressor 15a.

In S504, it is judged whether the intake air pressure Pa is equal to or higher a set value or not.

The set value connoted herein implies a intake air pressure capable of rising the combustion gas mixed intake air temperature enough to cause the thermal damage to the intake system structure. When the intake air is compressed by the compressor 15a, a degree of rise in the temperature of the intake air toward the engine body 3 increases correspondingly.

If Pa≧the set value, the judgement is affirmative, and the processing advances to S505. Whereas if not, the judgement is negative, and the processing proceeds to S506. The processing advances to S505 in a case where the engine 1 is in an operation state of such a tendency as to increase the temperature of the combustion gas mixed intake air toward the engine body 3 with a rise in the intake air pressure Pa. Further, the processing proceeds to S506 in a case where the engine 1 is in an operation state of such a tendency as to decrease the temperature of the combustion gas mixed intake air toward the engine body 3 with a decrease in the intake air pressure Pa.

The intake air pressure Pa is judged to be high in S504, and therefore the processing advances to S505, in which case there is performed the control of reducing the output of the combustion heater 17. Further, the intake air pressure Pa is judged to be low in S504, and therefore the processing advances to S506, in which case there is performed the control of gaining a more increased output of the combustion heater 17 than the control, performed in S505, of the output of the combustion heater 17.

In S505, it is judged whether or not the predicted temperature Tm is equal to or higher than a predetermined value "2" set as a specified value. The predetermined value "2" given herein implies a combustion gas mixed intake air temperature enough to cause the thermal damage to the structure of intake system.

If Tm≧the predetermined value "2", the judgement is affirmative, and the processing advances to S507. Whereas if not, the judgement is negative, and the processing proceeds to S508.

In S507, the output of the combustion heater 17 is reduced down to a target value "4" set as a specified value, and thereafter this routine is ended.

In S508, the output of the combustion heater 17 is increased up to a target value "3" set as a specified value, and thereafter this routine is ended.

The target value "4" and the target value "3" have a relationship such as the target value "3" > the target value "4".

The reason why is that if judged to be affirmative in S505, the predicted temperature Tm becomes much higher than the present temperature unless the output of the combustion heater 17 is decreased, it follows that the temperature gets much larger than the predetermined value "2" of the combustion gas mixed intake air temperature enough to cause the thermal damage to the structure of intake system. Further, if judged to be negative in S505, since the present combustion gas mixed intake air temperature is lower than the predetermined value "2" enough to cause the thermal damage to the structure of intake system even by increasing the output of the combustion heater 17, it is more desirable to increase the output of the combustion heater 17 in order to speed up the warm-up and the enhance the performance of the car room heater 9.

On the other hand, it is judged in S506 whether or not the predicted temperature Tm is equal to or higher than a predetermined value "1" different from the predetermined value "2" relative to S505 which has been set as the specified value. The predetermined value "1" given herein has the same concept as that of the predetermined value "2" and implies a combustion gas mixed intake air temperature enough to cause the thermal damage to the structure of intake system, but is set to indicate a higher temperature than the predetermined value "2". This is because a degree of supercharging and a temperature rise in the compressor are small.

If judged to be negative in S506, the processing advances to S509. Whereas if not, the judgement is affirmative, and the processing proceeds to S510.

In S509, the output of the combustion heater 17 is increased up to the target value "1" set as the specified value, and thereafter this routine comes to an end.

In S506, the output of the combustion heater 17 is decreased down to the target value "2" set as the specified value, and thereafter this routine is finished.

The target value "1" and the target value "2" have a relationship such as the target value "1"> the target value "2". The reason why is that if judged to be negative in S506, the predicted temperature Tm is lower than the predetermined value "1" enough to cause the thermal damage to the structure of intake system even by increasing the output of the combustion heater 17 in S509, and therefore it is more desirable to increase the output of the combustion heater 17 for enhancing the performance of the car room heater 9 as well as for speeding up the warm-up. Further, if judged to be affirmative in S506, since it might be a trouble that the predicted combustion gas mixed intake air temperature is as high as causing the thermal damage to the structure of intake system. Therefore, the output of the combustion heater 17 is reduced down to the target value "2" set as the specified value so as to become a combustion gas mixed intake air temperature not causing the thermal damage to the structure of intake system by decreasing the pressure of the fuel pump relative to the fuel supply pipe 17e for supplying the combustion heater 17 with the fuel for combustion or decreasing the rotational speed of the blowing fan 45. If the output of the combustion heater 17 is not decreased aiming at the target value "2", it follows that the predicted temperature Tm get much higher than the present temperature, with the result that the temperature becomes even larger than the predetermined value "2" of the combustion gas mixed intake air temperature enough to cause the thermal damage to the structure of intake system.

Moreover, the target values "1", "2", "3" and "4" have a relationship such as the target value "1" > the target value "2">the target value "3">the target value "4".

Thus, the output of the combustion heater 17 is controlled corresponding to the relationship of the target value "1">the target value "2">the target value "3">the target value "4", whereby the output of the combustion heater 17 can be finely controlled corresponding to both of the increase/decrease of the intake air pressure Pa and the increase/decrease of the predicted temperature Tm.

The internal combustion engine A5 having the combustion heater in the fifth embodiment exhibits the following operation and effect while enhancing the performance of the car room heater and speeding up the warm-up by utilizing the combustion heater of the combustion heater 17 as in the case of the internal combustion engine A1 having the combustion heater in the first embodiment.

To be specific, in the internal combustion engine A5 having the combustion heater, if the intake air pressure Pa is equal to or higher than the predetermined value, the combustion quantity of the combustion heater 17 is decreased.

When the intake air pressure Pa is high, the temperature of the intake air rises, and it is therefore required that the intake air temperature be preferable by decreasing the combustion quantity of the combustion heater 17, corresponding thereto.

What has been thus done makes it feasible to reduce the burden upon the inter cooler 19 coupled with the supercharger 15.

Further, if the intake air pressure Pa is over the set value, and if the predicted temperature Tm of the combustion gas mixed intake air is over the predetermined value, the intake air temperature can be set preferable by decreasing the combustion quantity of the combustion heater 17. In this case also, the burden upon the inter cooler 19 can be reduced.

<Sixth Embodiment>

Figure 11:
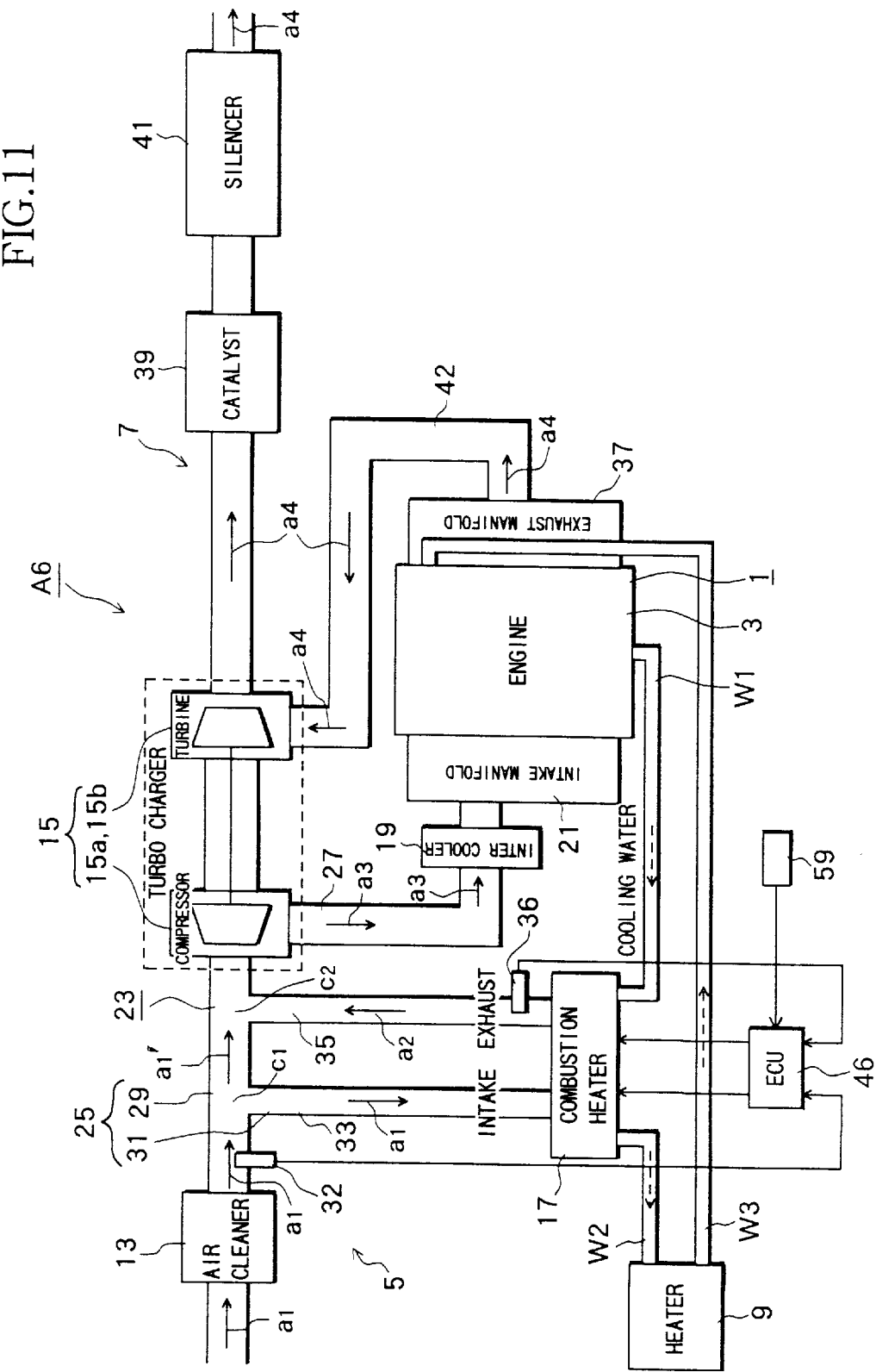
FIG. 11 is a schematic diagram showing a sixth embodiment of the internal combustion engine having the combustion heater according to the present invention.
Figure 12:
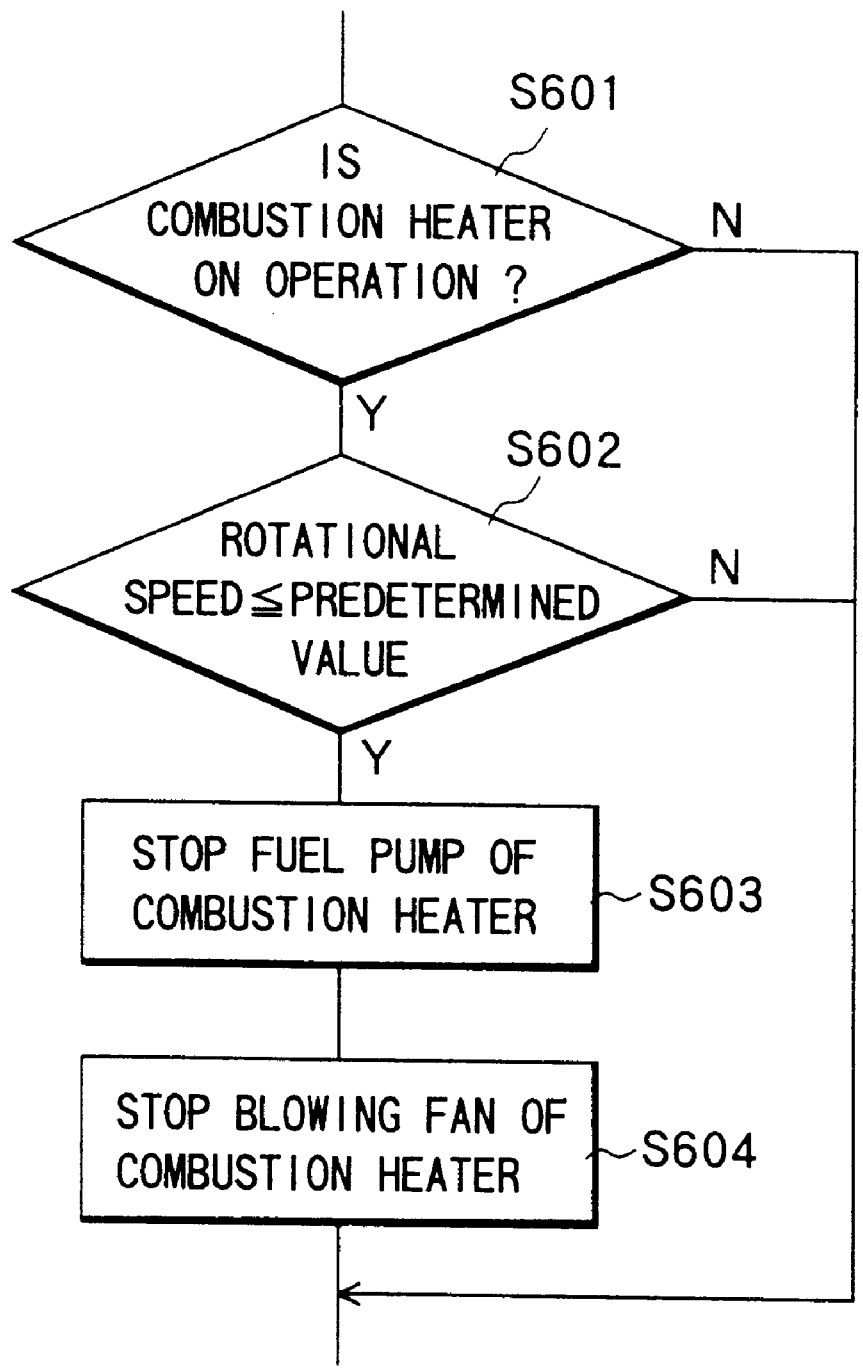
FIG. 12 is a flowchart showing an operation control routine in the sixth embodiment in FIG. 11.

A sixth embodiment of the present invention will be discussed referring to FIGS. 11 and 12.

The internal combustion engine having the combustion heater in the sixth embodiment is designated by the reference symbol A6. A difference of the internal combustion engine A6 having the combustion heater in the sixth embodiment from the internal combustion engine A1 having the combustion heater in the first embodiment is only the operation control routine.

Explained therefore is only the operation control routine of the internal combustion engine A6 having the combustion heater in the sixth embodiment. Note that the reference symbols used for the terms in the description of the operation control routine in the sixth embodiment, are the same as those of the internal combustion engine A1 having the combustion heater in the first embodiment, and hence FIG. 1 showing the first embodiment may be referred to.

The operation control routine in the sixth embodiment is described.

This control routine is also a part of a normal flowchart (not shown) when driving the engine 1, and consists of steps 601–604 which will hereinafter be described.

After starting the engine 1, the processing moves to this routine. It is judged in S601 whether or not the combustion heater 17 is now in the process of operation.

If judged to be affirmative in S601, the processing advances to next S602. Whereas if judged to be negative, this routine is ended. The negative judgement may be, for instance, a case of having no necessity for speeding up the warm-up of the internal combustion engine by operating the combustion heater 17 or for warming the interior of the car room by use of the car room heater 9 because of the outside air temperature being high.

It is judged in S602 whether or not the rotational speed is equal to or lower than a predetermined value. Note that the predetermined value is the specified rotational speed as the above-mentioned "target rotational speed" set slightly higher than the explained previously "limit rotational speed".

The reason why the target rotational speed is set higher than the limit rotational speed, is that an allowance of some extent is given because it might be a trouble that the thermal damage is exerted on the structure of intake system upon reaching the rotational speed to the limit rotational speed.

If judged to be affirmative in S602, the processing Aid proceeds to next S603. Whereas if judged to be negative in S602, this routine is ended, because if the rotational speed is higher than the target rotational speed, this might be ruled out for the sixth embodiment.

In S603, the unillustrated fuel pump of the combustion heater 17 is stopped.

In next S604, the blowing fan 45 of the combustion heater 17 is halted, and thereafter this routine is finished.

As described above, in the internal combustion engine A6 having the combustion heater, when the rotational speed is under the target rotational speed, the combustion quantity of the combustion heater 17 is decreased.

In the internal combustion engine A6 having the combustion heater in the sixth embodiment, when the combustion gas of the combustion heater 17 enters the main pipe 29, the fresh air turns out to be the combustion gas mixed intake air a3 toward the engine body 3. The combustion gas mixed intake air a3 is the mixed gas of the high-temperature combustion gas a2 with the cold fresh outside air a1'. Hence, if a quantity of the combustion gas a2 contained in the combustion gas mixed intake air a3 per unit capacity remains the same, and if a quantity of the fresh air a1' is small, the temperature of the combustion gas mixed intake air a3 rises. By contrast, if the quantity of the fresh air a1' is large, the temperature of the combustion gas mixed intake air a3 lowers. Then, in the internal combustion engine A6 having the combustion heater of the present invention, when the engine rotates at a speed under the target rotational speed in a low-rotation region where the quantity of the air sucked in the engine body 3, i.e., the quantity of the fresh air a1' is small, the contrivance is to decrease the quantity of the combustion gas a2 of the combustion heater 17. Consequently, the temperature of the combustion gas mixed intake air a3 decreases. Accordingly, it is feasible to prevent the thermal damage from being exerted upon the structure of intake system by the ECU 46 well controlling the ratio of the combustion gas a2 to the fresh air a1'.

Further, the quantity of the air sucked in the engine body 3 is small in the low-rotation region, at which time the combustion heater 17 stops with a halt of the fuel pump thereof and a halt of the blowing fan 45. Therefore, the fuel supply to the combustion heater 17 is cut off, and it follows that the flames in the combustion heater 17 are produced by only the residual fuel in the combustion heater 17. Normally, the residual quantity is small, and consequently a duration of flaming comes to an end in a short time. Hence, an heating value of the combustion heater 17 is remarkably reduced. It can be therefore said that the thermal damage to the structure of intake system can be prevented when the engine intake quantity is small.

<Seventh Embodiment>

A seventh embodiment of the present invention will be discussed referring to FIGS. 13 and 14.

The internal combustion engine having the combustion heater in the seventh embodiment is designated by the reference symbol A7. Differences of the internal combustion engine A7 having the combustion heater in the seventh embodiment from the internal combustion engine A6 having the combustion heater in the sixth embodiment are a point that the intake manifold 21 is provided with a throttle valve and a case of a throttle valve aperture being small is dealt with as a case of the intake quantity being small, and a point that in this connection the operation control routine differs. Therefore, the explanation is concentrated on only the different points, and the description of the same components is omitted.

Figure 13:
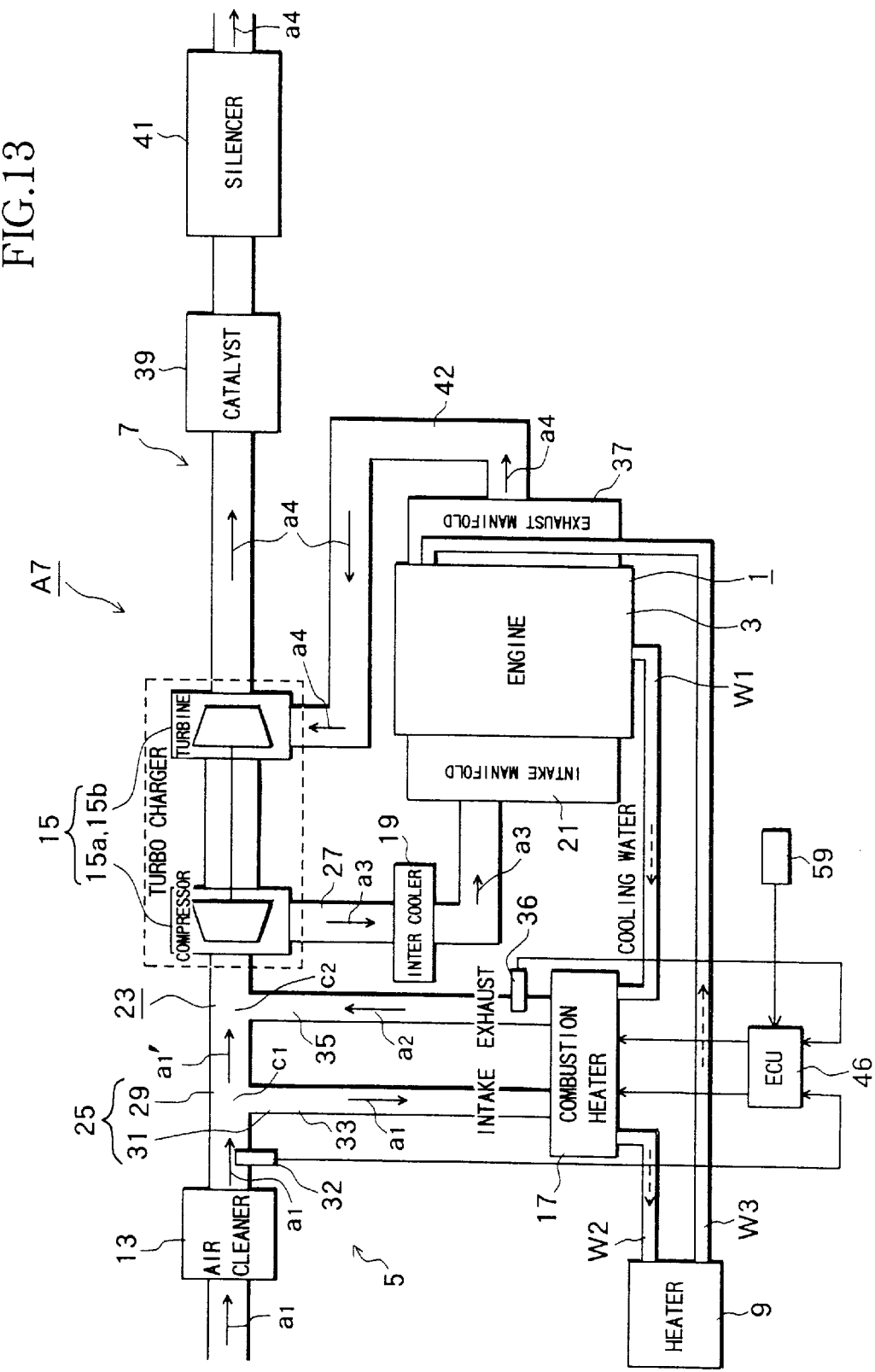
FIG. 13 is a schematic diagram showing a seventh embodiment of the internal combustion engine having the combustion heater according to the present invention.

A throttle valve 82 linked to an unillustrated accelerator pedal is, as illustrated in FIG. 13, provided at a portion, located downstream of the inter cooler 19, of the downstream-side connecting pipe 27 in such a form as to be attached to an intake manifold 21.

Figure 14:
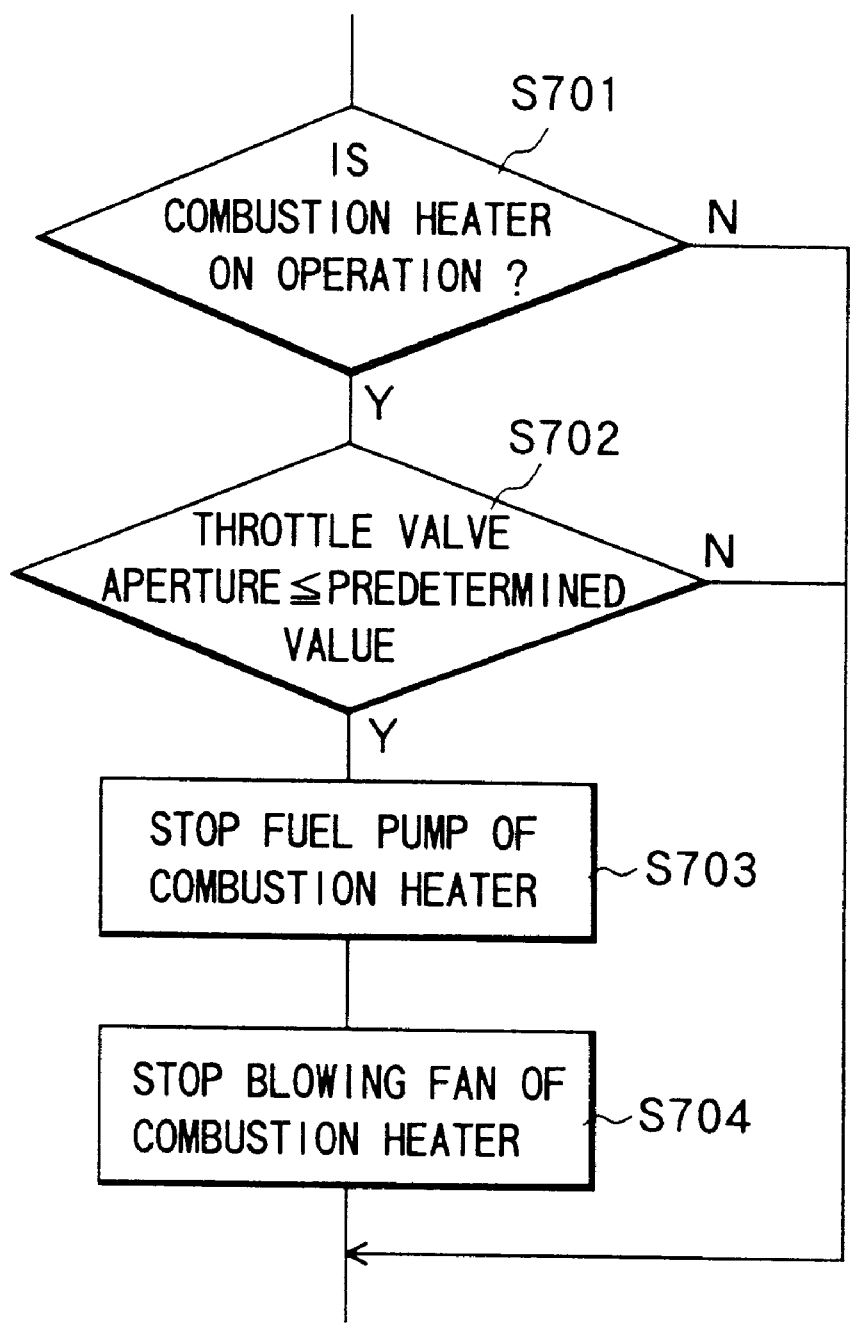
FIG. 14 is a flowchart showing an operation control routine in the seventh embodiment in FIG. 13.

Next, the operation control routine in the seventh embodiment is explained referring to FIG. 14.

This control routine is also a part of a normal flowchart (not shown) when driving the engine 1, and consists of steps 701–704 which will hereinafter be described. It is to be noted that steps S701, S703 and S704 excluding S702 are the same as steps S601, S603 and S604 in the internal combustion engine A6 having the combustion heater in the sixth embodiment, and hence the explanation thereof is omitted.

After starting the engine 1, the processing moves to this routine. Then, the processing proceeds via S701 to S702, wherein it is judged whether or not the aperture of the throttle valve 82 is under a predetermined value. The predetermine value given herein is a numerical value for indicating a specified throttle valve aperture set somewhat lower than another specified aperture of the throttle valve 82. The former specified throttle valve aperture is hereinafter referred to as a target throttle valve aperture. The latter is hereinafter referred to as a limit throttle valve aperture. The limit throttle valve aperture is a throttle valve aperture for ensuring a intake air quantity making the combustion gas mixed intake air temperature high enough to exert the thermal damage to the structure of intake system if the engine is driven with a certain aperture when the throttle valve 82 is opened, and if the combustion heater 17 continues to operate in this driven state.

The reason why the target throttle valve aperture is set higer than the limit throttle valve aperture, is that an allowance of some extent is given because it might be a trouble that the thermal damage is exerted on the structure of intake system upon reaching the throttle valve aperture to the limit throttle valve aperture.

If judged to be affirmative in S702, the processing proceeds to next S673. Whereas if judged to be negative, this routine is ended, because if the throttle valve aperture is larger than the target throttle valve aperture, this might be ruled out for the invention.

Thus, in the internal combustion engine A7, when the throttle valve is opened with an aperture smaller than the target throttle valve aperture, the quantity of the combustion gas of the combustion heater 17 is decreased.

In the internal combustion engine A7 having the combustion heater in the seventh embodiment, when the combustion gas of the combustion heater 17 enters the main pipe 29, the fresh air becomes the combustion gas mixed intake air a3 toward the engine body 3. The combustion gas mixed intake air a3 is the mixed gas of the high-temperature combustion gas a2 with the cold fresh outside air a1'. Hence, if the quantity of the combustion gas a2 contained in the combustion gas mixed intake air a3 per unit capacity remains the same, and if the quantity of the fresh air a1' is small, the temperature of the combustion gas mixed intake air a3 rises. By contrast, if the quantity of the fresh air a1' is large, the temperature of the combustion gas mixed intake air a3 lowers. Then, in the internal combustion engine A7 having the combustion heater of the present invention, when the throttle valve is opened with an aperture under the target throttle valve aperture in which the quantity of the air, i.e., the fresh air a1' sucked in the engine body 3 is small, the quantity of the combustion gas a2 of the combustion gas mixed intake air a3 is decreased. With this contrivance, the temperature of the combustion gas mixed intake air a3 lowers. Accordingly, it is feasible to prevent the thermal damage from being exerted upon the structure of intake system by the ECU 46 well controlling the ratio of the combustion gas a2 to the fresh air a1'.

Further, when the aperture of the throttle valve is equal to or lower than the target throttle valve aperture, the quantity of the air sucked in the engine body 3 is small, at which time the combustion heater 17 stops with the halt of the fuel pump and with the halt of the blowing fan 45. Consequently, the fuel supply to the combustion heater 17 is cut off, and it follows that the flames in the combustion heater 17 are produced by only the residual fuel in the combustion heater 17. Normally, the residual quantity is small, and hence a duration of flaming comes to an end in a short time. Hence, the heating value of the combustion heater 17 is remarkably reduced. It can be therefore said that the thermal damage to the structure of intake system can be also thereby prevented when the engine intake quantity is small.

<Eighth Embodiment>

An eighth embodiment of the present invention will be discussed by referring to FIGS. 15 and 16.

The internal combustion engine having the combustion heater in the eighth embodiment is designated by the reference symbol A8. This internal combustion engine A8 having the combustion heater in the eighth embodiment is substantially the same with the internal combustion engine A3 having the combustion heater in the third embodiment. The only difference is that in the eighth embodiment the quantity of fresh air entering into the air flow meter 70 is detected, and the detected quantity of fresh air is inputted into the ECU 46 as an output signal generated by the air flow meter 70, thereby the ECU 46 can make an optimal control of the combustion heater 17 according to the output signal based on the quantity of fresh air. Therefore, the explanation is concentrated on only the different points, and the description of the same components is omitted.

Figure 15:
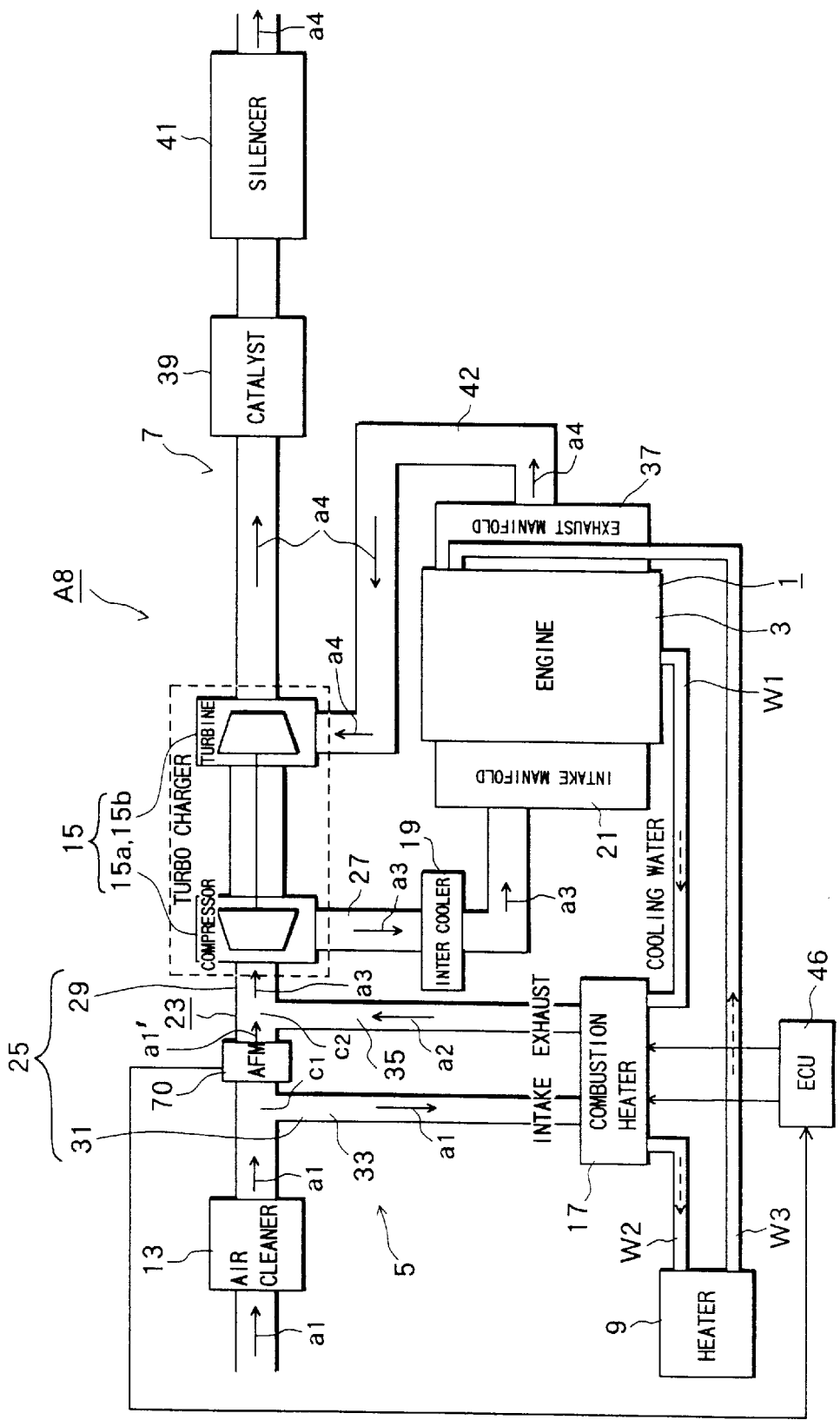
FIG. 15 is a schematic diagram showing an eighth embodiment of the internal combustion engine having the combustion heater according to the present invention.

As shown in FIG. 15, the air flow meter 70 disposed between the connecting points c1 and c2 respectively connecting the air supply passageway 33 with the main pipe 29 and the combustion gas discharge passageway 35 with the main pipe 29 is electrically connected with the ECU 46. In addition, the ECU 46 is electrically connected to the blowing fan 45 and the fuel pump (not shown), and, consequently, the CPU 47 of the combustion heater 17 operates directly or indirectly at least according to the output signal generated by the air flow meter 70, thereby the blowing fan 45 and the fuel pump work for the suitable combustion state of the combustion heater 17. Practically, the output values of the outside air temperature 32, the combustion gas temperature sensor 36, the number-of-rotations sensor 59, etc. are also factors for determining the combustion state of the combustion heater 17. However, for the sake of simplicity, these components are omitted from FIG. 15. The eighth embodiment may be so designed to also include the throttle valve 82 of the seventh embodiment.

Figure 16:
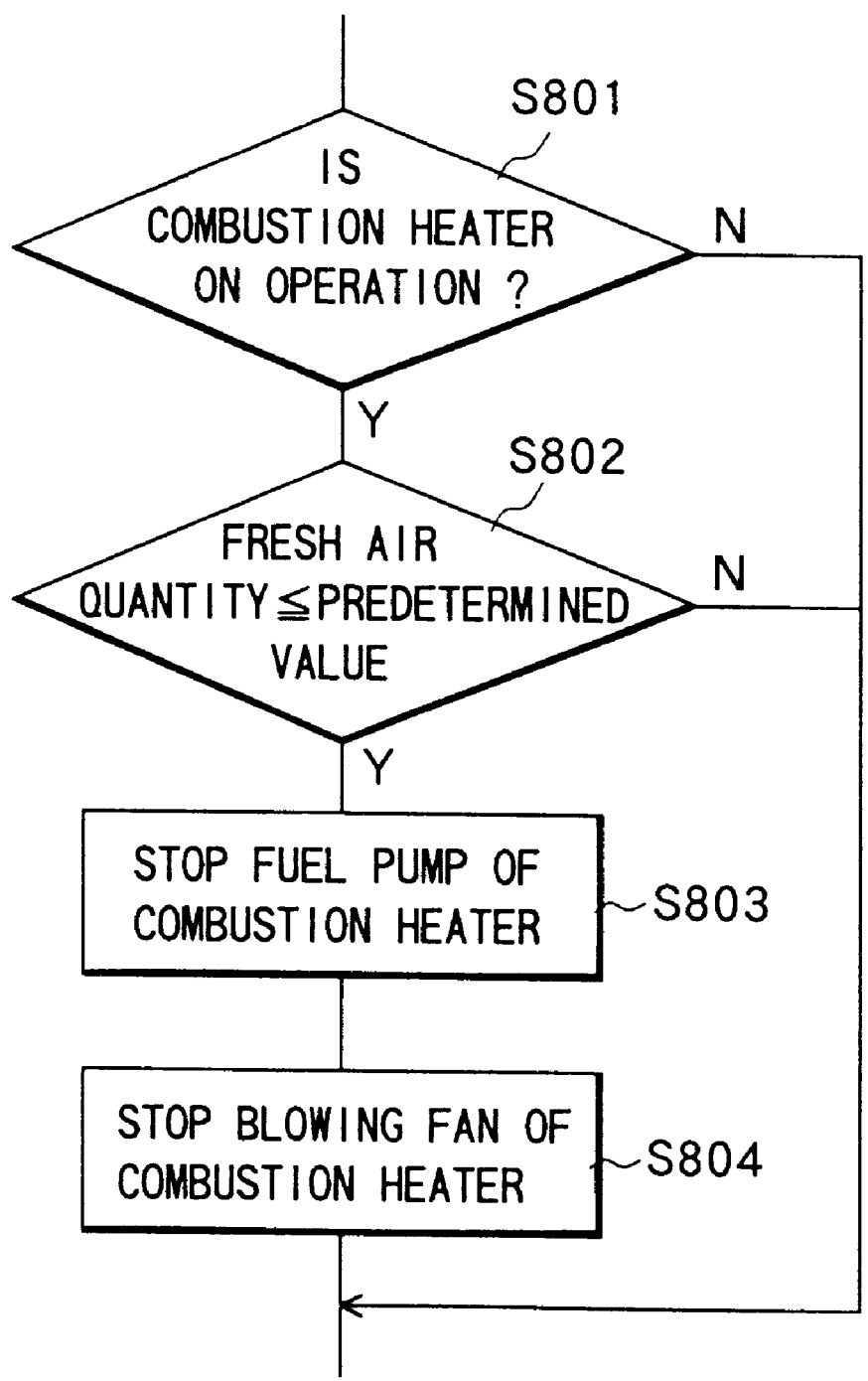
FIG. 16 is a flowchart showing an operation control routine in the eighth embodiment in FIG. 15.

Next, the operation control routine in the eighth embodiment is explained by referring to FIG. 16.

This control routine is also a part of a normal flowchart (not shown) when driving the engine 1, and consists of steps S801–S804 which will hereinafter be described. It is to be noted that steps S801, S803 and S804, are the same as steps S601, S603 and S604 in the internal combustion engine A6 having the combustion heater in the sixth embodiment, and hence the explanation thereof is omitted.

After starting the engine 1, the processing moves to this routine. Then, the processing proceeds via S801 to S802, wherein it is judged whether or not the quantity of fresh air entering into the air flow meter 70 is equal to or lower than a predetermined value. "The predetermined value of the quantity of fresh air" is a specified quantity of fresh air set slightly higher than another specified quantity of fresh air. The former specified quantity of fresh air is hereinafter referred to as a target quantity of fresh air. The latter is hereinafter referred to as a limit quantity of fresh air. The limit quantity of fresh air is a quantity of fresh air for ensuring an intake air quantity making the combustion gas mixed intake air temperature high enough to exert the thermal damage to the structure of intake system if the internal combustion engine is driven with this limit quantity of fresh air, and if the combustion heater continues to operate with the driving of the internal combustion engine. If the quantity of fresh air abruptly reaches the limit fresh air quantity, it exerts the thermal damage to the structure of intake system, and in order to prevent this, some allowance is given.

If judged to be affirmative in S802, the processing proceeds to the next S803. Whereas if judged to be negative, this routine is ended, because if the quantity of fresh air is larger than the target quantity of fresh air, this might be ruled out for the eighth embodiment.

Thus, in the internal combustion engine A8 having the combustion heater, when the quantity of fresh air supplied to the engine 1 through the air flow meter 70 is equal to or lower than the target quantity of fresh air, the combustion quantity of the combustion heater 17 is decreased.

In the internal combustion engine A8 having the combustion heater in the eighth embodiment, when the combustion gas of the combustion heater 17 enters the main pipe 29, the fresh air becomes the combustion gas mixed intake air a3 toward the engine body 3. The combustion gas mixed intake air a3 is the mixed gas of the high-temperature combustion gas a2 with the cold fresh outside air a1' which passes through the air flow meter 70 where the flow rate of fresh outside air a1' is detected. Accordingly, if the quantity of fresh air a1' is small, and if the quantity of combustion gas a2 contained in the combustion gas mixed intake air a3 per unit capacity remains the same, the temperature of the combustion gas mixed intake air a3 rises. By contrast, if the quantity of the fresh air a1' is large, the temperature of the combustion gas mixed intake air a3 lowers. Then, in the internal combustion engine A8 having the combustion heater of the eighth embodiment, when the air sucked into the engine body 3, namely, the quantity of fresh air supplied into the engine body 3 is equal to or smaller than the target fresh air quantity, the quantity of combustion gas a2 of the combustion heater 17 is decreased, thereby the temperature of the gas mixed intake air a3 is lowered. Accordingly, it is feasible to prevent the thermal damage from being exerted upon the structure of the intake system by the ECU 46 well controlling the ratio of the combustion gas a2 to the fresh air a1'. Further, when the quantity of fresh air is smaller than the target quantity of fresh air, the quantity of the air sucked in the engine body 3 is small, at which time the combustion heater 17 stops its operation with the halt of the fuel pump and with the halt of the blowing fan 45. Consequently, the fuel supply to the combustion heater 17 is cut off, and it follows that the flames in the combustion heater 17 are produced by only the residual fuel in the combustion heater 17. Normally, the residual quantity is small, and hence a duration of flaming comes to an end in a short time. Hence, the heating value of the combustion heater 17 is remarkably reduced. It can be therefore said that the thermal damage to the structure of the intake system can be also prevented when the engine intake quantity is small.

<Ninth Embodiment>

A ninth embodiment of the present invention will be discussed referring to FIGS. 17 and 18.

The internal combustion engine having the combustion heater in the ninth embodiment is designated by the reference symbol A9. The internal combustion engine A9 having the combustion heater in the ninth embodiment is an improvement of the internal combustion engine A8 having the combustion heater in the eighth embodiment. They differ from one another only in the points that in the ninth embodiment an exhaust cooler is provided on the combustion gas discharge passageway 35 of the combustion heater 17, a so-called EGR system is also provided, and an electrically-driven cooling water pump is attached to the water conduit W1. Thus, portions relative to the above are also different. Hence, only the different points are described, and the description of the same components is omitted if not particularly notified.

Figure 17:
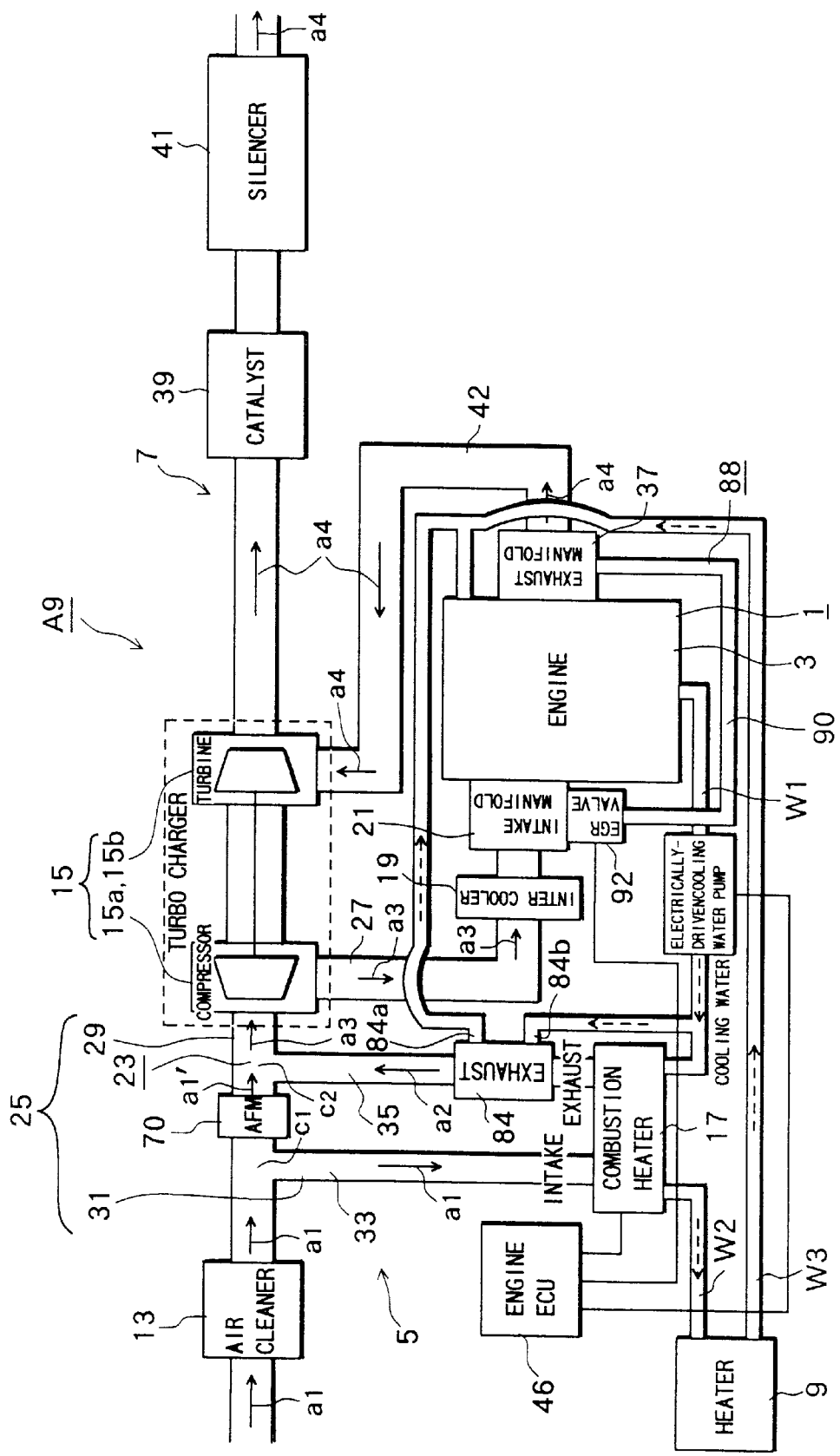
FIG. 17 is a schematic diagram showing a ninth embodiment of the internal combustion engine having the combustion heater according to the present invention.

As illustrated in FIG. 17, an exhaust cooler 84 is disposed in the combustion gas discharge passageway 35 of the combustion heater 17 and this exhaust cooler 84 functions mainly when the engine 1 stops. The exhaust cooler 84 is formed inside with an unillustrated water passageway, and both ends 84a, 84b of this water passageway are connected to the water jacket of the engine body 3 and the water conduit W1, respectively.

The exhaust cooler 84 is contrived to function when the engine 1 stops, and therefore the water conduit W1 is fitted with the electrically-driven cooling water pump 86, whereby the cooling water for the exhaust cooler 84 can be circulated even during the halt of the engine 1.

Moreover, the engine body 3 is provided with an EGR system 88 for returning a part of the exhaust gas to the intake system and introducing the exhaust gas again into the cylinders. The EGR system 88 includes an exhaust gas re-circulation passageway 90 connected in bypass to the engine body 3 for re-circulating the exhaust gas from an exhaust pipe 42 to the downstream-side connecting pipe 27. The exhaust gas re-circulation passageway 90 has an EGR valve 92 for controlling a flow rate of the re-circulated exhaust gas. The EGR valve 92 is electrically connected to the ECU 46 and opens when the engine 1 stops.

Figure 18:
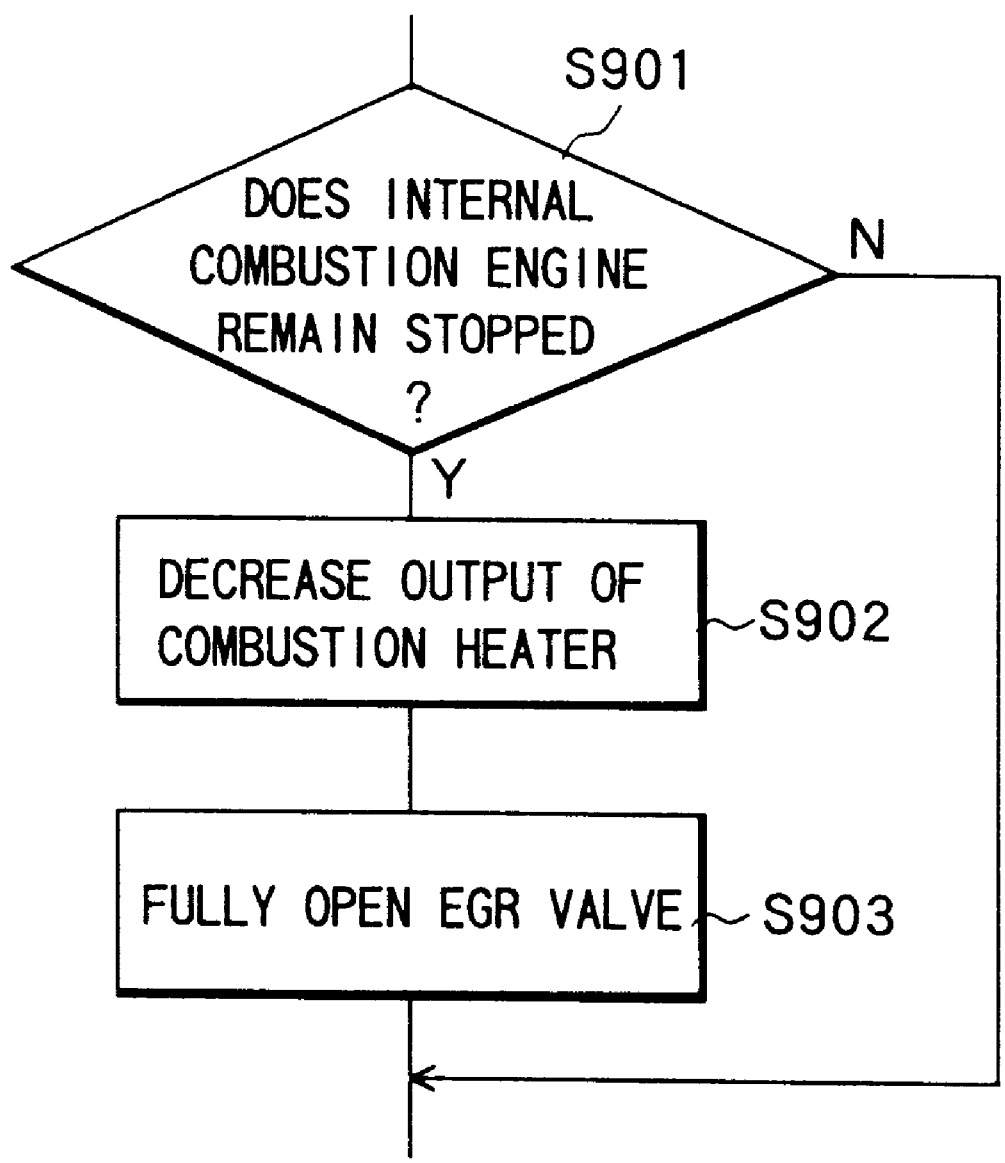
FIG. 18 is a flowchart showing an operation control routine in the ninth embodiment in FIG. 17.

Next, the operation control routine in the ninth embodiment is explained referring to FIG. 18.

This control routine is also a part of a normal flowchart (not shown) when driving the engine 1, and consists of steps 901–903 which will hereinafter be described.

After starting the engine 1, the processing moves to this routine, at which time it is judged in S901 whether or not the engine 1 now remains stopped.

If judged to be affirmative in S901, the processing advances to next S902. Whereas if judged to be negative, this routine is ended, because if the engine is not in the stopped state, this might be ruled out for the ninth embodiment.

In S902, the output of the combustion heater 17 is decreased.

In next S903, the EGR valve is fully opened, and thereafter this routine is finished.

In the internal combustion engine A9 having the combustion heater in the ninth embodiment, when the engine 1 is operated, the combustion gas of the combustion heater 17 is introduced into the engine body 3 and is therefore, while being supplied for speeding up the warm-up, re-burned in the cylinders of the engine 1. The re-burned combustion gas emits almost no smokes, in other words, contains no carbon, and hence the durability of the engine 1 is to be improved.

Further, if the combustion heater 17 operates during the halt of the engine 1, the combustion gas emitted out of the combustion heater 17 is flowed to the exhaust pipe 42 and discharged therefrom into the atmospheric air, which may be said to be sufficiently satisfactory as a measure against the exhaust gas of the combustion heater 17. Accordingly, since the treatment of the exhaust gas of the combustion heater 17 is sufficient even during the stop of the engine 1, it never happens that the combustion heater 17 stops due to an insufficient treatment of the exhaust gas of the combustion heater 17, and the combustion heater 17 can be independently operated. The combustion heat of the combustion heater 17 is also utilized for warming the air blown from the car room heater 9. Therefore, if the combustion heater 17 is made to work before getting in the car, the car room heater 17 can be switched ON beforehand, so that the interior of the car room is warm and comfortable even at the cold time. Note that a process of previously switching ON and warming up the combustion heater 17 may be termed pre-heating of the combustion heater 17.

Then, when the combustion heater 17 is in a pre-heating state, the combustion gas emitted from the combustion heater 17 is introduced into the exhaust pipe 42 via the EGR system. At this time, the combustion gas emitted from the combustion heater 17, to begin with, arrives at the EGR system 88 through the intake system. Even at that time, however, since the combustion gas out of the combustion heater 17 via the exhaust cooler 84 provided in the combustion gas discharge passageway 35 is cooled off, the intake system is not influenced at all by the thermal damage.

Further, the EGR system 88 is originally provided, whereby the costs can be reduced.

As discussed above, according to the present invention, the combustion gas emitted from the combustion heater operating when the internal combustion engine is in the predetermined operation state, is mixed into the intake air passageway, whereby the fresh air having flowed so far through the intake air passageway becomes the high-temperature combustion gas mixed intake air assuming the combustion heat of the combustion gas. Before the combustion gas mixed intake air enters the internal combustion engine body, the temperature of the combustion gas mixed intake air is obtained. The combustion state of the combustion heater is controlled based on the thus obtained temperature, and therefore, if this control is preferably carried out, it is feasible to restrain the excessive rise in the intake system temperature due to the combustion heat while speeding up the warm-up and enhancing the performance of the car room heater by utilizing the combustion heat of the combustion heater. The thermal damage to the intake system structure can be thereby prevented.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having a combustion heater, comprising:

a combustion heater operating when said internal combustion engine is in a predetermined operation state; and engine related elements warmed by heat of a combustion gas emitted by said combustion heater during a combustion to speed up a warm-up of said internal combustion engine and to enhance a performance of a car room heater of a vehicle mounted with said internal combustion engine, wherein fresh air becomes a combustion gas mixed intake air flowing toward said internal combustion engine body by mixing the combustion gas of said combustion heater with the fresh air entering an intake air passageway of said internal combustion engine, a temperature of the combustion gas mixed intake air is obtained by combustion gas mixed intake air temperature calculating means for calculating a temperature of the fresh air and a temperature of the combustion gas, and a combustion state of said combustion heater is controlled based on the temperature of the combustion gas mixed intake air.

2. An internal combustion engine having a combustion heater according to claim 1, wherein the calculation by said combustion gas mixed intake air temperature calculating means includes the rotational speed of said internal combustion engine.

3. An internal combustion engine having a combustion heater according to claim 1, wherein a combustion quantity of said combustion heater is decreased when the temperature of the combustion gas mixed intake air flowing through the intake air passageway of said internal combustion engine, or the temperature itself of the fresh air, or the temperature itself of the combustion gas of said combustion heater is equal to or higher than a predetermined value.

4. An internal combustion engine having a combustion heater, comprising:

a combustion heater operating when said internal combustion engine is in a predetermined operation state; and engine related elements warmed by heat of a combustion gas emitted by said combustion heater during a combustion to speed up a warm-up of said internal combustion engine and to enhance a performance of a car room heater of a vehicle mounted with said internal combustion engine, wherein said combustion heater is provided in a branch pipe which bypasses a main pipe of the intake air passageway of the internal combustion engine, and an air supplying passage and a combustion gas discharging passage which comprise the branch pipe are connected to the main pipe, and wherein fresh air becomes a combustion gas mixed intake air flowing toward said internal combustion engine body by mixing the combustion gas of said combustion heater with the fresh air entering an intake air passageway of said internal combustion engine, a temperature of the combustion gas mixed intake air is obtained, and a combustion state of said combustion heater is controlled based on this temperature.

5. An internal combustion engine having a combustion heater, comprising:

a combustion heater operating when said internal combustion engine is in a predetermined operation state; and engine related elements warmed by heat of a combustion gas emitted by said combustion heater during a combustion to speed up a warm-up of said internal combustion engine and to enhance a performance of a car room heater of a vehicle mounted with said internal combustion engine, wherein a combustion heater is provided in a branch pipe which bypasses a main pipe of the intake air passageway of the internal combustion engine, and an air supplying passage and a combustion gas discharging passage which comprise the branch pipe are connected to the main pipe, and wherein a combustion state of said combustion heater is controlled based on a temperature of fresh air itself entering an intake air passageway of said internal combustion engine.

6. An internal combustion engine having a combustion heater, comprising:

a combustion heater operating when said internal combustion engine is in a predetermined operation state; and engine related elements warmed by heat of a combustion gas emitted by said combustion heater during a combustion to speed up a warm-up of said internal combustion engine and to enhance a performance of a car room heater of a vehicle mounted with said internal combustion engine, wherein said combustion heater is provided in a branch pipe which bypasses a main pipe of the intake air passageway of the internal combustion engine, and an air supplying passage and a combustion gas discharging passage which comprise the branch pipe are connected to the main pipe, and wherein a combustion state of said combustion heater is controlled based on a temperature of the combustion gas itself emitted from said combustion heater.

7. An internal combustion engine having a combustion heater according to claims 4 to 6, wherein said air supplying passage and said combustion gas discharging passage which comprise the branch pipe are connected to an upper stream side of a supercharger.

8. An internal combustion engine having a combustion heater according to claims 4 to 6, wherein said air supplying passage and said combustion gas discharging passage which comprise the branch pipe are connected to the same passage which communicates to the supercharger.

* * * * *